United States Patent
Sen et al.

(10) Patent No.: US 10,509,513 B2
(45) Date of Patent: Dec. 17, 2019

(54) SYSTEMS AND METHODS FOR USER INPUT DEVICE TRACKING IN A SPATIAL OPERATING ENVIRONMENT

(71) Applicant: Oblong Industries, Inc., Los Angeles, CA (US)

(72) Inventors: Ayon Sen, Pasadena, CA (US); John Underkoffler, Los Angeles, CA (US); Barbara Brand, Los Angeles, CA (US); Michael Chin, Rosemead, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 83 days.

(21) Appl. No.: 15/890,189

(22) Filed: Feb. 6, 2018

(65) Prior Publication Data
US 2018/0225007 A1    Aug. 9, 2018

Related U.S. Application Data

(60) Provisional application No. 62/456,043, filed on Feb. 7, 2017.

(51) Int. Cl.
*G09G 5/00* (2006.01)
*G06F 3/042* (2006.01)
(Continued)

(52) U.S. Cl.
CPC ............ *G06F 3/0425* (2013.01); *G06T 7/248* (2017.01); *G06T 7/74* (2017.01); *G06T 2207/30244* (2013.01)

(58) Field of Classification Search
CPC ...... G06F 3/017; G06F 3/0304; G06F 3/0317; G06F 3/0346; G06F 3/042; G06F 3/0425;
(Continued)

(56) References Cited

U.S. PATENT DOCUMENTS

| 7,197,165 B2 * | 3/2007 | Ryan | G06F 3/013 |
| | | | 382/103 |
| 7,742,623 B1 * | 6/2010 | Moon | G06K 9/00604 |
| | | | 382/103 |

(Continued)

FOREIGN PATENT DOCUMENTS

| EP | 2656101 B1 | 10/2016 |
| WO | 2014075090 A1 | 5/2014 |

OTHER PUBLICATIONS

Hyakutake, Akito , et al., "3-D Interaction with a Large Wall Display using Transparent Markers", Graduate School of Information Systems, University of Electro-Communications, 1-5-1 Chofugaoka Chofu Tokyo 182-8585, Japan, pp. 97-100.

*Primary Examiner* — Joe H Cheng
(74) *Attorney, Agent, or Firm* — Jeffrey Schox; Shant Tchakerian

(57) ABSTRACT

Systems and methods for tracking using a tracking camera. For each frame of image data generated by the tracking camera, each blob of the frame is determined. For each determined blob, a 2D image coordinate of a centroid of the blob is determined in a coordinate space of the frame. A tracking system processor generates a first tag identifier from the determined 2D image coordinates. The tracking system processor uses the first tag identifier to access stored first tag information that is stored in association with the first tag identifier. The tracking system processor determines an absolute 3-space position and orientation of the tracking camera by performing a motion tracking process using the determined 2D image coordinates and the accessed first tag information.

18 Claims, 14 Drawing Sheets

(51) Int. Cl.
  *G06T 7/246* (2017.01)
  *G06T 7/73* (2017.01)

(58) Field of Classification Search
  CPC ........... G06T 7/74; G06T 7/246; G06T 7/248; G09G 5/00; H04N 5/2256
  See application file for complete search history.

(56) References Cited

U.S. PATENT DOCUMENTS

| | | | |
|---|---|---|---|
| 7,885,784 B2* | 2/2011 | Frank | A63B 24/0021 |
| | | | 702/150 |
| 8,564,667 B2* | 10/2013 | Yun | G01S 3/7865 |
| | | | 348/143 |
| 8,929,598 B2* | 1/2015 | Yoneyama | G06K 9/00234 |
| | | | 340/5.52 |
| 9,280,204 B2* | 3/2016 | Kim | G06F 3/013 |
| 9,317,134 B2 | 4/2016 | Clarkson et al. | |
| 9,377,866 B1 | 6/2016 | Schiewe | |
| 9,852,434 B2* | 12/2017 | Kuusisto | G06Q 30/02 |
| 10,140,726 B2* | 11/2018 | Nishino | G06K 9/00604 |
| 2001/0020933 A1* | 9/2001 | Maggioni | G06F 3/0428 |
| | | | 345/156 |
| 2003/0099375 A1* | 5/2003 | Sefcik | G06T 7/20 |
| | | | 382/103 |
| 2005/0117778 A1* | 6/2005 | Crabtree | G06K 9/00771 |
| | | | 382/103 |
| 2006/0028552 A1* | 2/2006 | Aggarwal | G01S 3/7864 |
| | | | 348/169 |
| 2006/0098873 A1* | 5/2006 | Hildreth | G06K 9/00375 |
| | | | 382/181 |
| 2008/0165163 A1 | 7/2008 | Bathiche | |
| 2010/0168562 A1 | 7/2010 | Zhao et al. | |
| 2014/0002342 A1* | 1/2014 | Fedorovskaya | G06Q 30/0271 |
| | | | 345/156 |
| 2014/0098018 A1 | 4/2014 | Kim et al. | |
| 2014/0145929 A1* | 5/2014 | Minnen | G06F 3/011 |
| | | | 345/156 |
| 2014/0195988 A1* | 7/2014 | Kramer | G06F 3/017 |
| | | | 715/863 |
| 2015/0070347 A1* | 3/2015 | Hofmann | G06K 9/00208 |
| | | | 345/419 |
| 2015/0308642 A1 | 10/2015 | Vo et al. | |
| 2016/0109566 A1* | 4/2016 | Liu | G01S 13/66 |
| | | | 342/52 |
| 2016/0377698 A1* | 12/2016 | Nielsen | G01S 5/0263 |
| | | | 342/450 |
| 2016/0379074 A1* | 12/2016 | Nielsen | G06K 9/3241 |
| | | | 348/143 |

* cited by examiner

SYSTEMS AND METHODS FOR USER INPUT DEVICE TRACKING IN A SPATIAL OPERATING ENVIRONMENT

CROSS-REFERENCE TO RELATED APPLICATIONS

This application claims the benefit of U.S. Provisional Application Ser. No. 62/456,043, filed on 7 Feb. 2017, which is incorporated in its entirety by this reference.

TECHNICAL FIELD

This disclosure herein relates generally to display systems, and more specifically to new and useful systems and methods for controlling display systems by using computing devices.

BACKGROUND

Typical display systems involve a computing device providing display output data to a display device that is coupled to the computing device. There is a need in the computing field to create new and useful systems and methods for controlling display systems by using computing devices. The disclosure herein provides such new and useful systems and methods.

DESCRIPTION OF EMBODIMENTS

Figure 1:
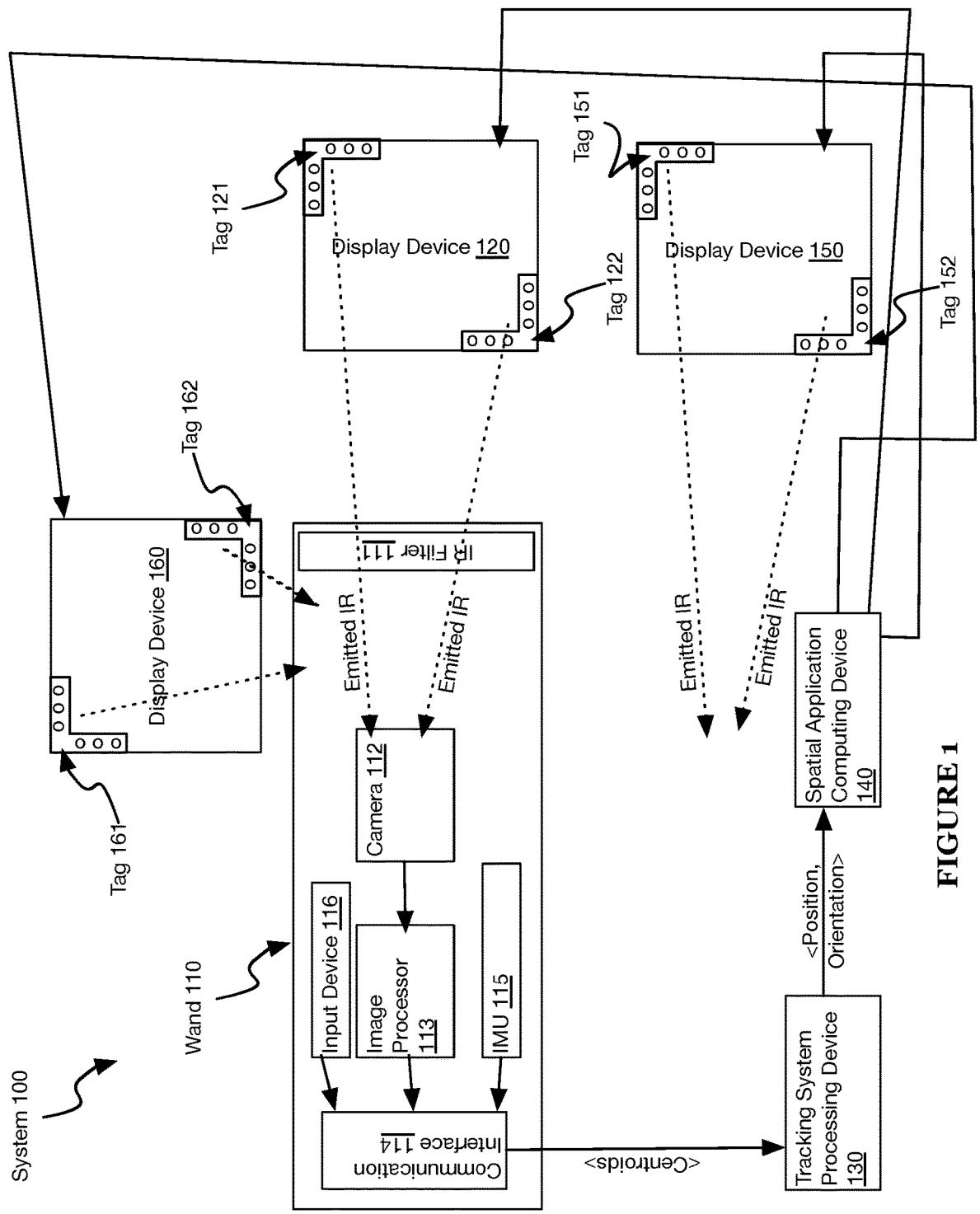
FIG. 1 is a schematic representation of a spatial operating environment system in accordance with embodiments.

The following description of embodiments is not intended to limit the invention to these embodiments, but rather to enable any person skilled in the art to make and use the embodiments.

Overview

Some embodiments herein include systems and methods that enable tracking of a user input device (e.g., the wand 110 of FIG. 1) in a spatial operating environment (e.g., provided by the system 100 of FIG. 1) by using an infrared (IR) camera (e.g., 112 of FIG. 1) of the user input device and infrared emitters (e.g., of the tags 121, 122 of FIG. 1) of a display device (e.g., one of the display devices 120, 150, 160 of FIG. 1) of the spatial operating environment. In some embodiments, the infrared emitters are included in (or arranged on) display devices of the spatial operating environment, the camera senses the IR light emitted from the infrared emitters, generates camera data from the sensed IR light, and the camera data is used to track the user input device. In some embodiments, tracking the user input device includes determining an absolute 3-space position of the user input device and an orientation of the user input device with respect to a display device (e.g., 120) of the spatial operating environment. In some embodiments, the determined position and orientation of the tracked user input device are provided to a spatial application computing device (e.g., 140 of FIG. 1) that is constructed to provide at least one spatial application and provide display data to at least one display device (e.g., 120, 150, 160) of the spatial operating environment.

In some embodiments, data from other sensors (e.g., an Inertial Measurement Unit, Global Positioning System, WiFi interface, and the like) or input devices (e.g., buttons, touch screens, microphones, etc.) of the user input device are used (either in combination with camera data or in place of camera data) to determine the position and orientation of the tracked user input device.

In some embodiments, each IR emitter is included in a tag (e.g., 121, 122, 151, 152, 161, 162 of FIG. 1) that includes a plurality of IR emitters. In some embodiments, each tag (e.g., 121, 122, 151, 152, 161, 162) includes 6 IR emitters. In some embodiments, each IR emitter is an IR LED (light emitting diode). In some embodiments, each tag (e.g., 121, 122, 151, 152, 161, 162) is coupled to a power source that powers the IR emitters of the tag. In some implementations, each tag (e.g., 121, 122, 151, 152, 161, 162) includes a housing that positions each of the IR emitters in a predetermined position that is unique to the corresponding display device. In some implementations, each tag (e.g., 121, 122, 151, 152, 161, 162) is included in a display device, and each IR emitter of a tag is arranged in a predetermined position at the display device, and the positioning of each tag is unique to the display device. In some embodiments, each tag (e.g., 121, 122, 151, 152, 161, 162) includes two sets of IR emitters, each set of emitters arranged on a straight line; the two lines intersect; the intersection angle of the two intersecting lines is the same for each tag in the spatial operating environment. In some embodiments, the intersection angle of each tag is 90 degrees. In some embodiments, the intersection angle of each tag is greater than 90 degrees. In some embodiments, the intersection angle of each tag is less than 90 degrees. In some embodiments, each tag includes 6 IR emitters; for each tag, each of the two lines includes 3 IR emitters, and none of the IR emitters of the tag are positioned at the intersection point of the two lines of the tag. In some embodiments, each tag includes more than 6 IR emitters; for each tag, each of the two lines includes at least 3 IR emitters, each line includes the same number of IR emitters, and none of the IR emitters of the tag are positioned at the intersection point of the two lines of the tag.

By virtue of tracking a user input device by using an infrared (IR) camera of the user input device and infrared emitters of display devices, the cost and installation time for a spatial operating environment system can be improved, as compared to a spatial operating environment system that uses ultrasonic tracking systems or tracking systems that involve use of multiple cameras external to the user input device.

By virtue of tracking a user input device according to embodiments described herein, human machine interface modalities that rely on precise, accurate, and high-frame-rate absolute position-and-orientation information can be enabled. Of special importance are pointing modalities derived from this real-time information in which, for example, a free-ranging user may from any position within an extended tracking volume point with pixel accuracy at one or more graphical objects depicted on any of a plurality of displays and, by pointing dynamically, move, scale, and further manipulate the object or objects. Embodiments described herein further allow these manipulations to occur on, between, across, and among displays arrayed throughout an architectural space, situated individually and in contiguous groups, occupying a single surface or on multiple non-coplanar surfaces, with the whole forming a spatial display continuum in which every pixel is mapped computationally to the unique real-world position that it physically occupies.

Systems

FIG. 1 is a schematic representation of a spatial operating environment system in accordance with embodiments.

As shown in FIG. 1, in some embodiments, the spatial operating environment system 100 includes a user input device 110, display devices 120, 150, 160, a tracking system processing device 130, and a spatial application computing device 140.

In some embodiments, the user input device 110 is a wand. In some embodiments, the user input device 110 includes an IR filter 111. In some embodiments, the user input device 110 includes a camera 112. In some embodiments, the user input device 110 includes an image processor 113. In some embodiments, the user input device 110 includes an Inertial Measurement Unit 115. In some embodiments, the user input device 110 includes a communication interface 114. In some embodiments, the user input device 110 includes at least one input device 116. In some embodiments, the camera 112 is communicatively coupled to the image processor 113. In some embodiments, the image processor 113 is communicatively coupled to the communication interface 114. In some embodiments, the input device 116 is communicatively coupled to the communication interface 114. In some embodiments, the IMU 115 is communicatively coupled to the communication interface 114. In some embodiments, the IMU 115 is constructed to send IMU data to the tracking system processing device 130 via the communication interface 114.

In some embodiments, the camera includes a sensor constructed to sense IR light. In some embodiments, the camera includes a sensor constructed to sense IR light and visible light. In some embodiments, the IR filter is constructed to filter out visible light and pass IR light to the camera 112.

In some embodiments, the communication interface 114 is a wireless interface (e.g., Bluetooth). In some embodiments, the communication interface 114 is a wired interface. In some embodiments, the communication interface 114 is a Bluetooth radio.

In some embodiments, the input device 116 includes at least one of buttons and a touch screen input device (e.g., a capacitive touch input device). In some embodiments, the input device 116 includes other devices (e.g., sensors, GPS device, WiFi device, and the like) that are communicatively coupled to the communication interface 114.

In some embodiments, the image processor 113 is a FPGA. In some embodiments, the image processor 113 is an ASIC. In some embodiments, the image processor 113 is a programmable microprocessor that is constructed to execute machine-executable instructions stored by a storage device included in the user input device 110, and the machine-executable instructions are image processing instructions. In some embodiments, the image processor 113 is constructed to perform real-time edge detection. In some embodiments, the image processor 113 is constructed to perform real-time feature detection. In some embodiments, the image processor 113 is constructed to perform real-time feature extraction.

In some embodiments, each display device 120, 150, 160 includes at least one tag (e.g., 121, 122, 151, 152, 161, 162). In some embodiments, each display device 120, 150, 160 includes two tags (e.g., 121, 122, 151, 152, 161, 162). In some embodiments, each display device 120, 150, 160 includes four tags. In some embodiments, each tag includes 6 IR reflectors that are constructed to reflect IR light. In some embodiments, each tag includes 6 IR emitters that are constructed to emit IR light. In some embodiments, the IR emitters of each tag have a unique positioning, such that no two tags in the system 100 have a same positioning within the tag. In some embodiments, at least one tag is attached to the corresponding display device. In some embodiments, at least one tag is included in a bezel of the corresponding display device. In some embodiments, at least one tag is included in the display area of the corresponding display device. In some embodiments, in addition to emitting Red, Green and Blue light, each pixel of at least one display device also emits IR light, and sets of pixels of the display device form a tag. In some embodiments, in addition to emitting Red, Green and Blue light, a plurality of pixels of at least one display device also emits IR light, and sets of IR emitting pixels of the display device form a tag.

In some embodiments, the tracking system processing device 130 is constructed to receive centroid data from the user input device 110 via the communication interface 114, process the centroid data to generate an absolute 3-space position of the user input device (e.g., 110) and an orientation of the user input device with respect to a display device (e.g., 120) of the spatial operating environment, and provide the absolute 3-space position and the orientation to the spatial application computing device 140.

In some embodiments, the spatial application computing device 140 is constructed to receive the absolute 3-space position and the orientation from the tracking system processing device 130. In some embodiments, the spatial application (e.g., 1093 of FIG. 10) provided by the spatial application computing device 140 processes the position and orientation information to update application state. In some embodiments, the spatial application provided by the spatial application computing device 140 generates display data based on the position and orientation information and provides the generated display data to at least one display device (e.g., 120, 150, 160) of the spatial operating environment.

In some embodiments, a single computing device performs the processes of the tracking system processing device 130 and a spatial application computing device 140 as described herein.

In some embodiments, the tracking system processing device 130 is communicatively coupled to the spatial application computing device 140. In some embodiments, the tracking system processing device 130 is communicatively coupled to the spatial application computing device 140 via a network device (e.g., 911 of FIG. 9). In some embodiments, the spatial application computing device 140 is communicatively coupled to the display devices 120, 150 and 160. In some embodiments, the user input device 110 is communicatively coupled to the tracking system processing device 130. In some embodiments, the user input device 110 is communicatively coupled to the tracking system processing device 130 via a network device (e.g., 911 of FIG. 9). In some embodiments, the user input device 110 is communicatively coupled to the tracking system processing device 130 via a wired interface. In some embodiments, the user input device 110 is communicatively coupled to the tracking system processing device 130 via a wireless interface (e.g., Bluetooth).

Methods

Figure 2:
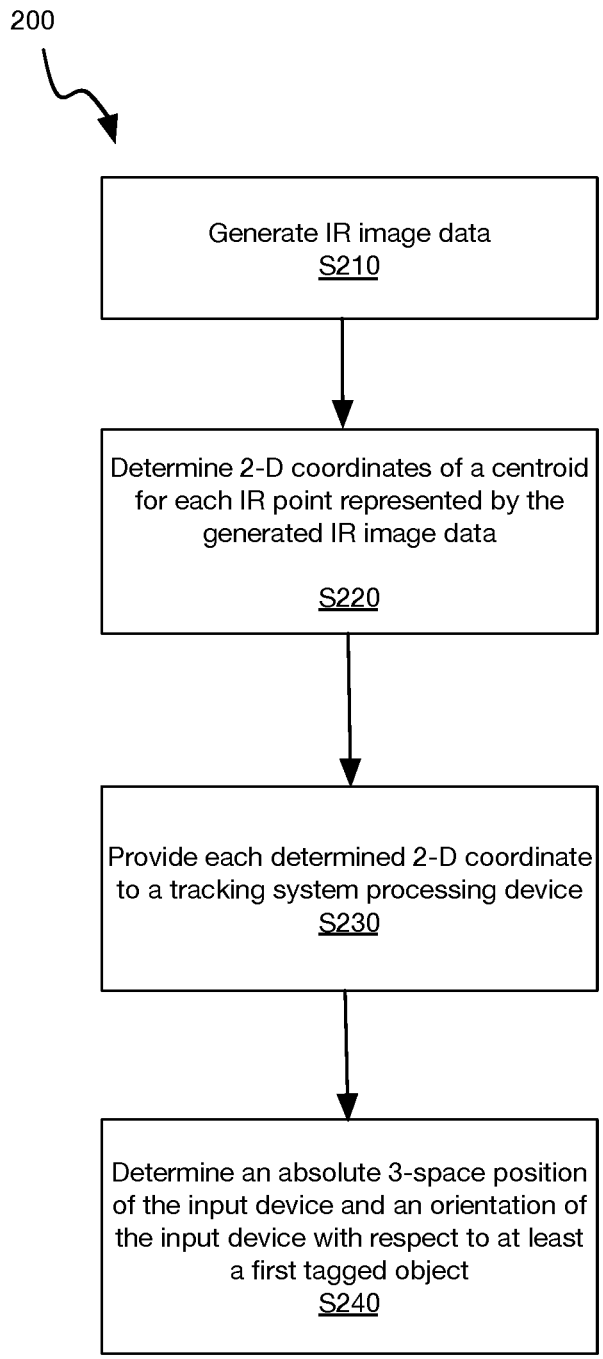
FIG. 2 is a flowchart representation of method in accordance with embodiments.

FIG. 2 is a flowchart representation of method in accordance with embodiments. The method 200 of FIG. 2 includes: a user input device generating IR image data (process S210); determining 2-D coordinates of a centroid for each IR point (e.g., points 602, 603 of FIG. 6) represented by the generated IR image data, within a coordinate space of the generated image (e.g., a coordinate pace of the image 600 of FIG. 6) (process S220); providing each determined 2-D coordinate to a tracking system processing device (e.g., 130) (process S230); the tracking system processing device determining an absolute 3-space position of the user input device (e.g., 110) and an orientation of the user input device with respect to at least a first tagged object that is associated with a plurality of IR points represented by the generated IR image, by using the determined 2-D coordinates (process S240). In some embodiments, the first tagged object is a first display device.

In some embodiments, the method 200 includes: providing the determined absolute 3-space position and the determined orientation to a spatial application computing device (e.g., 140).

In some embodiments, the camera 112 performs the process S210. In some embodiments, the camera 112 and the image processor 113 perform the process S210. In some embodiments, the image processor 113 performs the process S210. In some embodiments, the image processor 113 performs the process S220. In some embodiments, the communication interface 114 performs the process S220. In some embodiments, the image processor 113 and the communication interface 114 perform the process S220.

In some embodiments, the IR image data represents an image (e.g., the image 601 of FIG. 6) of IR light (IR point) received by the camera from IR emitters of the system 100 against a black background. In some embodiments, each IR point (e.g., IR points 602, 603 of FIG. 6) is IR light received by the camera 112 from IR emitters of the system 100. In some embodiments, the IR image data represents an IR point for each emitter that provides IR light received by the camera 112. In some embodiments, because the IR filter filters out visible light, the IR image data does not include data corresponding to visible light received by the IR filter.

In some embodiments, the first display device (e.g., 120) is associated with a first tag (e.g., 121), and the generated IR image (e.g., 601) represents IR points (e.g., 602, 603) for IR light emitted by each IR emitter of the first tag. In some embodiments, the first tag is attached to the first display device. In some embodiments, the first tag is included in the first display device. In some embodiments, the first display device is associated with a first tag (e.g., 121) and a second tag (e.g., 122), and the generated IR image represents IR points for IR light emitted by each IR emitter of the first tag and the second tag.

In some embodiments, determining an absolute 3-space position of the user input device (e.g., 110) and an orientation of the user input device includes: determining an absolute 3-space position of the user input device (e.g., 110) and an orientation of the user input device with respect to at least the first display device, and a second display device, wherein the second display device is associated with a plurality of IR points represented by the generated IR image.

In some embodiments, determining an absolute 3-space position of the user input device (e.g., 110) and an orientation of the user input device includes: determining an absolute 3-space position of the user input device (e.g., 110) and an orientation of the user input device with respect to at least the first display device, and a second display device, wherein the second display device is associated with a plurality of IR points represented by the generated IR image, and wherein the second display device is associated with a second tag, and the generated IR image represents IR points for IR light emitted by each IR emitter of the second tag.

In some embodiments, the generated IR image data is data of a single frame of data of the camera (e.g., 112).

Process S240: Determine an Absolute 3-Space Position and Orientation

Figure 3:
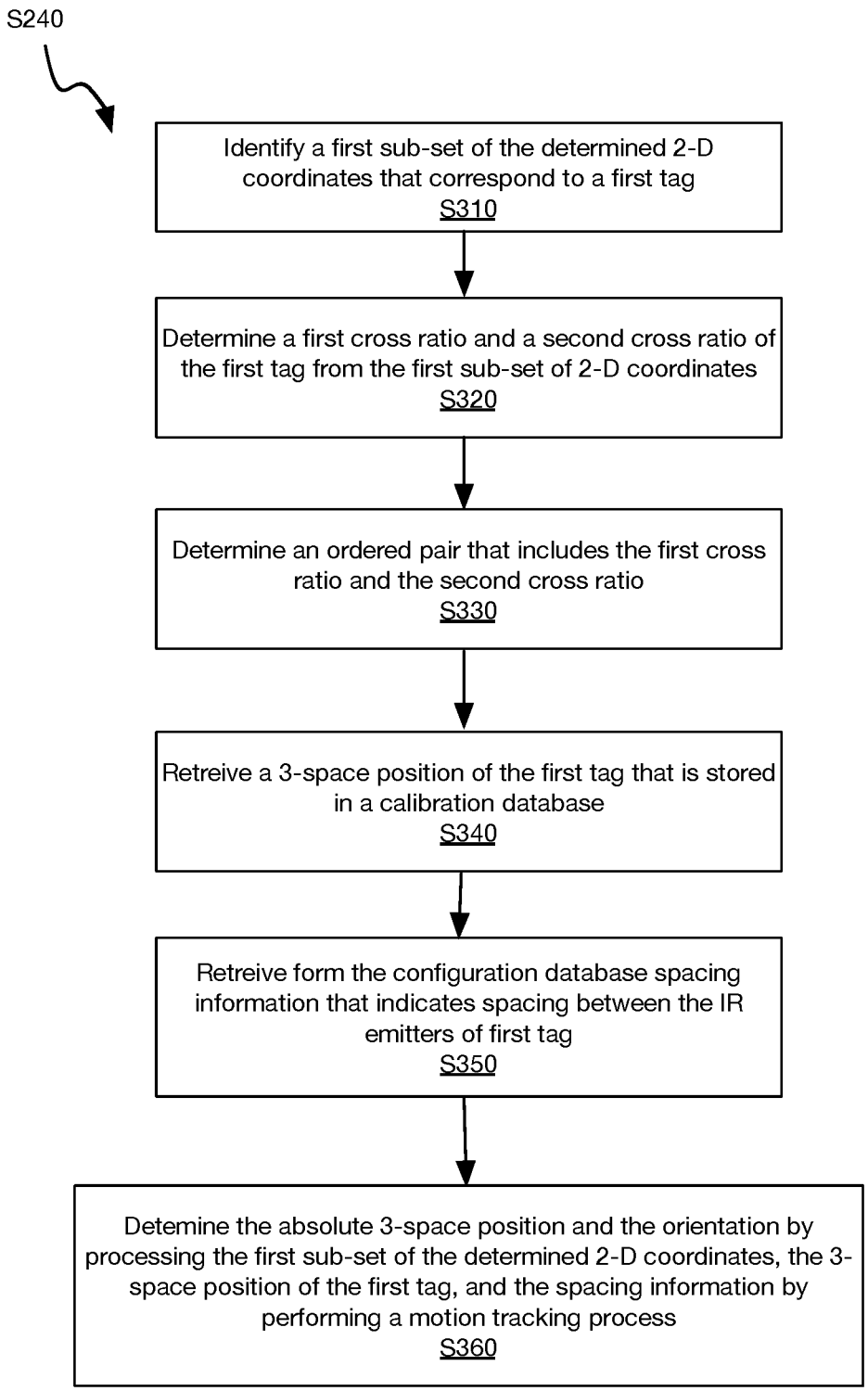
FIG. 3 is a flowchart representation of method in accordance with embodiments.

FIG. 3 is a flowchart representation of process of determining an absolute 3-space position and orientation, in accordance with embodiments. In some embodiments, determining the absolute 3-space position and the orientation includes: identifying a first sub-set of the determined 2-D coordinates that correspond to a first tag (e.g., a tag of the system 100 of FIG. 1) (e.g., coordinates of centroids of IR points 602 of FIG. 6) (process S310); determining a first cross ratio and a second cross ratio of the first tag from the first sub-set of 2-D coordinates (process S320); determining an ordered pair that includes the first cross ratio and the second cross ratio (process S330); retrieving a 3-space position of the first tag that is stored in a calibration database in association with the first ordered pair, wherein the 3-space position is a location within a coordinate space of the spatial operating environment (process S340); retrieving from the configuration database spacing information that indicates spacing between the IR emitters of first tag (process S350); determining the absolute 3-space position and the orientation by processing the first sub-set of the determined 2-D coordinates, the 3-space position of the first tag, and the spacing information by performing a Perspective-n-Point process (process S360).

By virtue of determining a first cross ratio and a second cross ratio of the first tag from the first sub-set of 2-D coordinates, it is possible to identify the first tag.

In some embodiments, the method 200 includes storing the 3-space position corresponding to the first tag by: generating a set of images (e.g., by using the camera 112) of the spatial operating environment that includes the first tag; using the generated set of images to generate the 3-space position for the first tag by performing a bundle adjustment process; and storing the generated 3-space position in association with the first ordered pair for the first tag.

In some embodiments, the method 200 includes storing the spacing information of the first tag in association with the first ordered pair for the first tag. In some embodiments, retrieving from the configuration database spacing information includes: retrieving the spacing information by using the first ordered pair for the first tag.

In some embodiments, the first cross ratio and the second cross ratio are stored in the configuration database as the first ordered pair, the order of the first cross ratio and the second cross ratio uniquely identifying the tag, such that a reordering of the two cross ratios identifies a different tag.

Identifying a Tag

Figure 4:
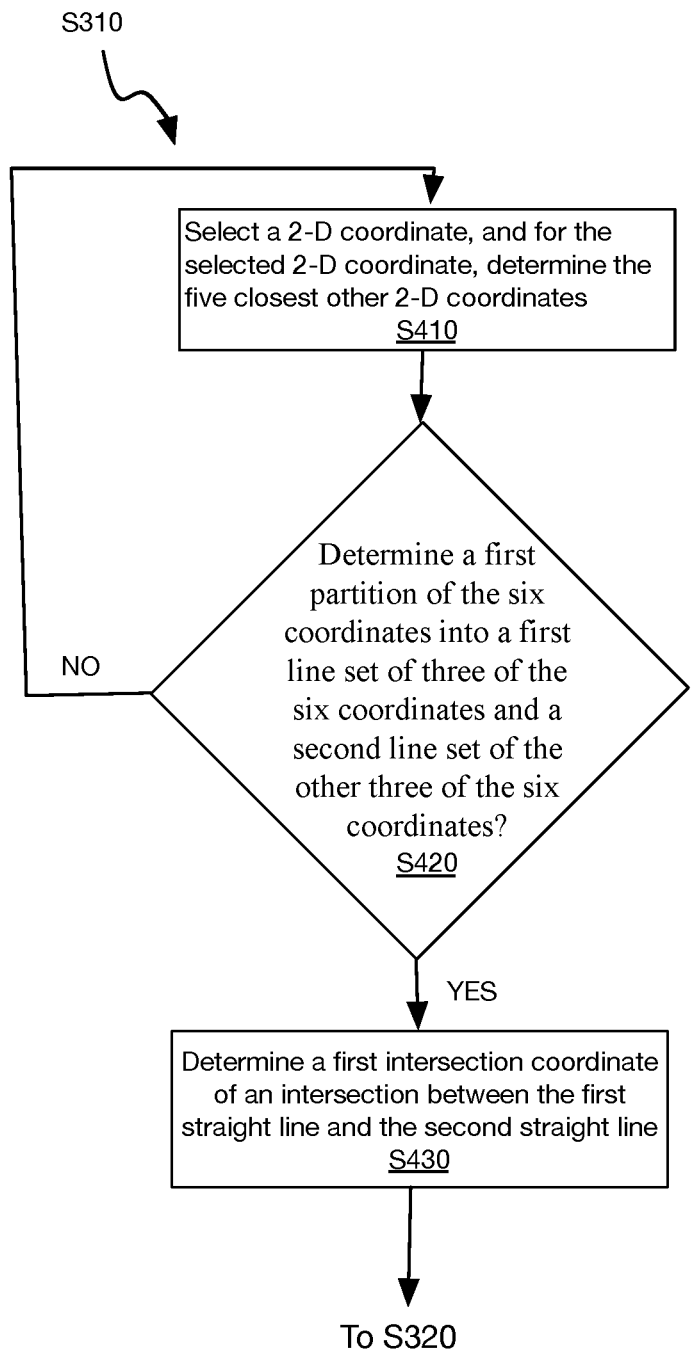
FIG. 4 is a flowchart representation of method in accordance with embodiments.

FIG. 4 depicts a process for identifying the first sub-set of the determined 2-D coordinates (e.g., coordinates P1-P6 of FIG. 7) that correspond to a first tag, according to some embodiments. In some embodiments, identifying the first sub-set of the determined 2-D coordinates that correspond to a first tag (the process S310) includes: for a first 2-D coordinate (e.g., P1 of FIG. 7) of the determined 2-D coordinates, determining the five closest other 2-D coordinates (e.g., P2-P6) of the determined 2-D coordinates (process S410); for a first candidate set of six 2-D coordinates that includes first 2-D coordinate and the five closest other 2-D coordinates (e.g., P1-P6 of FIG. 7), determine a first partition of the six coordinates into a first line set of three of the six coordinates and a second line set of the other three of the six coordinates, wherein coordinates in the first line set form a first straight line, and coordinates in the second line set form a second straight line (process S420). In some embodiments, determining the first partition includes: forming the first partition, determining a first line defined by two of the three coordinates of the first line set (e.g., computing y=mx+b), and determining whether the third point of the first line set is included in the first line. In some embodiments, determining the first partition includes: forming the first partition, determining a first line defined by two of the three coordinates of the first line set (e.g., computing y=mx+b), and determining whether the third point of the first line set is included in the first line, within a tolerance range.

Responsive to determining the first partition: determine a first intersection coordinate (e.g., P0 of FIG. 7) of an intersection between the first straight line and the second straight line (process S430).

In a case where the first partition is not determined, processing returns to the process S410.

Process S320: Determining Cross Ratios and Ordered Pair of Cross Ratios

Figure 5:
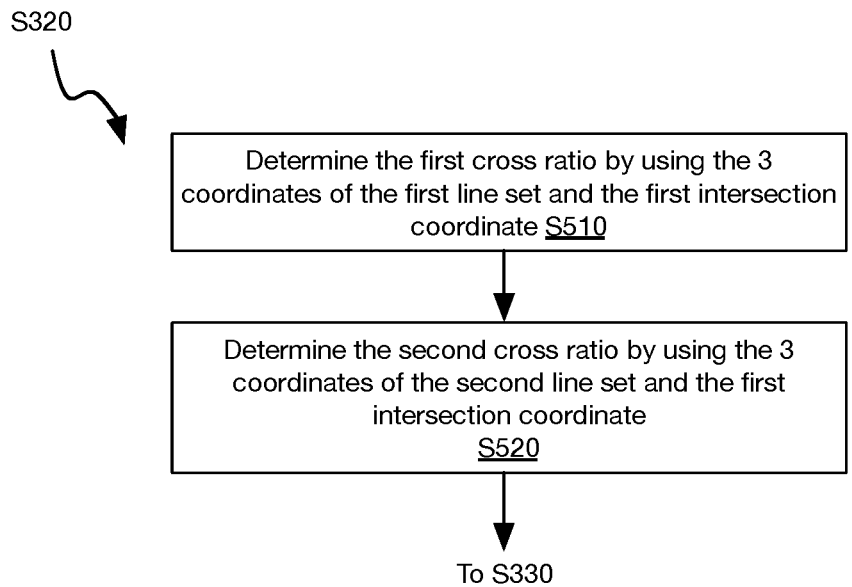
FIG. 5 is a flowchart representation of method in accordance with embodiments.

FIG. 5 depicts a process for determining cross ratios and order pair of cross ratios, in accordance with embodiments. In some embodiments, determining the first cross ratio and the second cross ratio (the process S320) includes determining the first cross ratio by using the 3 coordinates of the first line set and the first intersection coordinate (e.g., P1, P2, P3, P0 of FIG. 7) (process S510); and determining the second cross ratio by using the 3 coordinates of the second line set and the first intersection coordinate (e.g., P0, P4, P5, P6 of FIG. 7) (process S520).

By virtue of determining a first cross ratio and a second cross ratio of the first tag as described herein, it is possible to identify the first tag from a 2-D image of the first tag. More specifically, a cross ratio generated using using real-world 3-space coordinates of each of four points in a line is the same as a cross ratio generated using 2D coordinates of each of the four points in an image of the four points of the line, in a coordinate space of the image.

In some embodiments, determining an ordered pair that includes the first cross ratio and the second cross ratio (process S330) includes: determining a first cross product of a first vector (of the 3 coordinates of the first line set and the first intersection coordinate) (e.g., P0-P1 of FIG. 7) and a second vector (of the 3 coordinates of the second line set and the first intersection coordinate) (e.g., P6-P0 of FIG. 7); and responsive to a determination that the first cross product is a positive value, specify the first cross ratio as the first value in an ordered pair that includes the first cross ratio and the second cross ratio.

FIG. 6: IR Image

Figure 6:
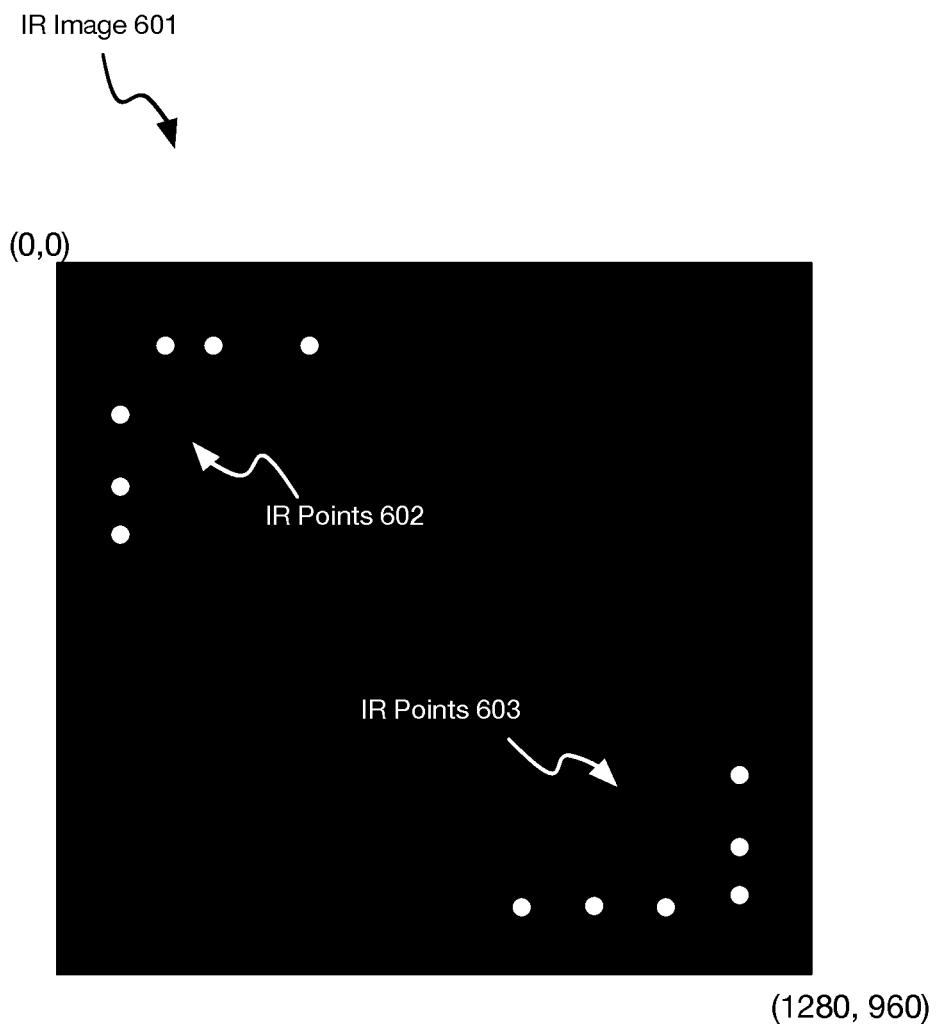
FIG. 6 is a diagram depicting an exemplary IR image, in accordance with embodiments.

FIG. 6 is a diagram depicting an exemplary IR image, in accordance with embodiments. As shown in FIG. 6, the IR image 601 is an image that corresponds to the IR image data generated at process S210 of FIG. 2. As shown in FIG. 6, IR points 602 correspond to a first tag, and IR points 603 correspond to a second tag. In some embodiments, the 2D coordinates of the centroids of the IR points 602 and 603 are determined at the process S220 of FIG. 2. By virtue of sensing IR light via an IR filter that is constructed to block visible light and transmit IR light, identification of IR points can be more easily performed.

Figure 7:
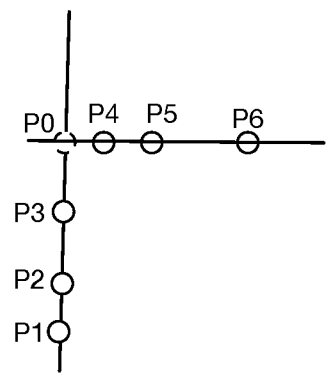
FIG. 7 is a diagram depicting a process for determining an ordered pair of cross products for exemplary 2-D coordinates, in accordance with embodiments.

FIG. 7: Determining an Ordered Pair

FIG. 7 is a diagram depicting a process for determining an ordered pair (e.g., process S330) of cross products for exemplary 2-D coordinates, in accordance with embodiments. The points P1, P2, P3, P4, P5, P6 of FIG. 7 are 2D coordinates of the IR points 602 of FIG. 6. As shown in FIG. 6, 2D coordinates P1, P2, and P3 lie on a first line, and 2D coordinates P4, P5, and P6 lie on a second line. Accordingly, 2D coordinates P1, P2, and P3 form a first line set, and 2D coordinates P4, P5, and P6 form a second line set. The intersection point of the first line and the second line is the 2D coordinate P0.

In some embodiments, the first cross ratio of the first line set is determined as shown in Equation 1:

$$\frac{P1P3 \cdot P2P0}{P1P0 \cdot P2P3}.$$

In some embodiments, the second cross ratio of the second line set is determined as shown in Equation 2:

$$\frac{P0P5 \cdot P4P6}{P0P6 \cdot P4P5}.$$

In some embodiments, the ordered pair of the first cross ratio and the second cross ratio is determined by taking the vector cross product of (P0−P1) and (P6−P0) (e.g., (P0−P1)×(P6−P0)); if the vector cross product is greater than zero, then the ordered pair includes the first cross ratio as the first value and the second cross ratio as the second value $$\left(\frac{P1P3 \cdot P2P0}{P1P0 \cdot P2P3}, \frac{P0P5 \cdot P4P6}{P0P6 \cdot P4P5}\right);$$

if the vector cross product is less than zero, then the ordered pair includes the second cross ratio as the first value and the first cross ratio as the second value $$\left(\frac{P0P5 \cdot P4P6}{P0P6 \cdot P4P5}, \frac{P1P3 \cdot P2P0}{P1P0 \cdot P2P3}\right).$$

Synthesizing Data from Multiple Sensors

In some embodiments, additional information is used to determine absolute 3-space position and orientation. In some embodiments, the additional information is used to determine absolute 3-space position and orientation for a point in time for which there is no IR image data. For example, if IR image data captured for a given time has not been received by the tracking system processing device 130 (e.g., due to a transmission delay, communication latency, camera is not pointing at a target, etc., or because the time period is between two image capture frames) in time to compute the position and orientation, the tracking system processing device 130 can use the additional information to determine the position and/or orientation.

In some embodiments, the camera 112 captures frames of IR image data at a rate of 30 frames per second, and in between frame captures, additional information is used to determine the position and orientation of the user input device 110. In some embodiments, the camera 112 captures frames of IR image data at a rate of 30 frames per second, and in between frame captures, information provided by the IMU 115 is used to determine the position and orientation of the user input device 110. In some embodiments, the IMU has a data capture rate of at least too frames per second. In some embodiments, the IMU has a data capture rate of at least 200 frames per second.

In some embodiments, in between camera frame captures of the camera 112, additional information is used to determine the position and orientation of the user input device 110. In some embodiments, the camera 112 captures frames of IR image data at a rate that is lower than a data capture rate of the IMU, and in between camera frame captures, information provided by the IMU 115 is used to determine the position and orientation of the user input device 110.

In some embodiments, the additional information is information provided by a sensor or device other than the camera 112. In some embodiments, the additional information is information provided by a GPS device. In some embodiments, the additional information is information provided by the IMU 115.

In some embodiments, the additional information is used to validate position and orientation determined by using the IR image data. In some embodiments, the additional information is used to determine absolute 3-space position and orientation for a point in time, and compare the position and orientation determined with a position and orientation determined by using IR image data, and the result of the comparison is used to validate the position and orientation determined by using the IR image data.

Estimating Position Based on Additional Information

In some embodiments, a moving horizon estimation process is used to estimate a position of the user input device 100 at time $t_n$ by using additional information (e.g., data of the IMU 115) received from the user input device 110 after time $t_w$ (up to time $t_n$), wherein $t_w$ is a time a first predetermined number of milliseconds before $t_n$, wherein $t_w$ is the time that is the beginning of a first time window, and wherein $t_n$ is the current time which indicates the end of the first time window; similarly, the tracking system processing device 130 uses the moving horizon estimation process to estimate the absolute 3-space position of the user input device (e.g., 110) at time $t_{n+1}$ (wherein $t_{n+1}$ is a time a second predetermined number of milliseconds after $t_n$) by using additional information (e.g., sensor data, IMU 115 data, etc.) received from the user input device 110 after time $t_{w+1}$ (up to time $t_{n+1}$), wherein $t_{w+1}$ is a time the first predetermined number of milliseconds before $t_{n+1}$, wherein $t_{w+1}$ is the time that is the beginning of a second time window, wherein $t_{n+1}$ is the current time which indicates the end of the second time window, and wherein $t_{w+1}$ is a time the second predetermined number of milliseconds after $t_w$.

Estimating Orientation Based on Additional Information

In some embodiments, a moving horizon estimation process is used to estimate an orientation of the user input device 110 at time $t_n$ by using additional information (e.g., data of the IMU 115) received from the user input device 110 after time $t_w$ (up to time $t_n$), wherein $t_w$ is a time a first predetermined number of milliseconds before $t_n$, wherein $t_w$ is the time that is the beginning of a first time window, and wherein $t_n$ is the current time which indicates the end of the first time window; similarly, the tracking system processing device 130 uses the moving horizon estimation process to estimate the orientation of the user input device (e.g., 110) at time $t_{n+1}$ (wherein $t_{n+1}$ is a time a second predetermined number of milliseconds after $t_n$) by using additional information (e.g., sensor data, IMU 115 data, etc.) received from the user input device 110 after time $t_{w+1}$ (up to time $t_{n+1}$), wherein $t_{w+1}$ is a time the first predetermined number of milliseconds before $t_{n+1}$, wherein $t_{w+1}$ is the time that is the beginning of a second time window, wherein $t_{n+1}$ is the current time which indicates the end of the second time window, and wherein $t_{w+1}$ is a time the second predetermined number of milliseconds after $t_w$.

Estimating Position Based on Camera Data and Additional Information

In some embodiments, a moving horizon estimation process is used to estimate a position of the user input device 110 at time $t_n$ by using additional information (e.g., data of the IMU 115) and IR image data received from the user input device 110 after time $t_w$ (up to time $t_n$), wherein $t_w$ is a time a first predetermined number of milliseconds before $t_n$, wherein $t_w$ is the time that is the beginning of a first time window, and wherein $t_n$ is the current time which indicates the end of the first time window; similarly, the tracking system processing device 130 uses the moving horizon estimation process to estimate the absolute 3-space position of the user input device (e.g., 110) at time $t_{n+1}$ (wherein $t_{n+1}$ is a time a second predetermined number of milliseconds after $t_n$) by using additional information (e.g., sensor data, IMU 115 data, etc.) and IR image data received from the user input device 110 after time $t_{w+1}$ (up to time $t_{n+1}$), wherein $t_{w+1}$ is a time the first predetermined number of milliseconds before $t_{n+1}$, wherein $t_{w+1}$ is the time that is the beginning of a second time window, wherein $t_{n+1}$ is the current time which indicates the end of the second time window, and wherein $t_{w+1}$ is a time the second predetermined number of milliseconds after $t_w$.

Estimating Orientation Based on Camera Data and Additional Information

In some embodiments, a moving horizon estimation process is used to estimate an orientation of the user input device 110 at time $t_n$ by using additional information (e.g., data of the IMU 115) and IR image data received from the user input device 110 after time $t_w$ (up to time $t_n$), wherein $t_w$ is a time a first predetermined number of milliseconds before $t_n$, wherein $t_w$ is the time that is the beginning of a first time window, and wherein $t_n$ is the current time which indicates the end of the first time window; similarly, the tracking system processing device 130 uses the moving horizon estimation process to estimate the orientation of the user input device (e.g., 110) at time $t_{n+1}$ (wherein $t_{n+1}$ is a time a second predetermined number of milliseconds after $t_n$) by using additional information (e.g., sensor data, IMU 115 data, etc.) and IR image data received from the user input device 110 after time $t_{w+1}$ (up to time $t_{n+1}$), wherein $t_{w+1}$ is a time the first predetermined number of milliseconds before $t_{n+1}$, wherein $t_{w+1}$ is the time that is the beginning of a second time window, wherein $t_{n+1}$ is the current time which indicates the end of the second time window, and wherein $t_{w+1}$ is a time the second predetermined number of milliseconds after $t_w$.

FIG. 8

Figure 8:
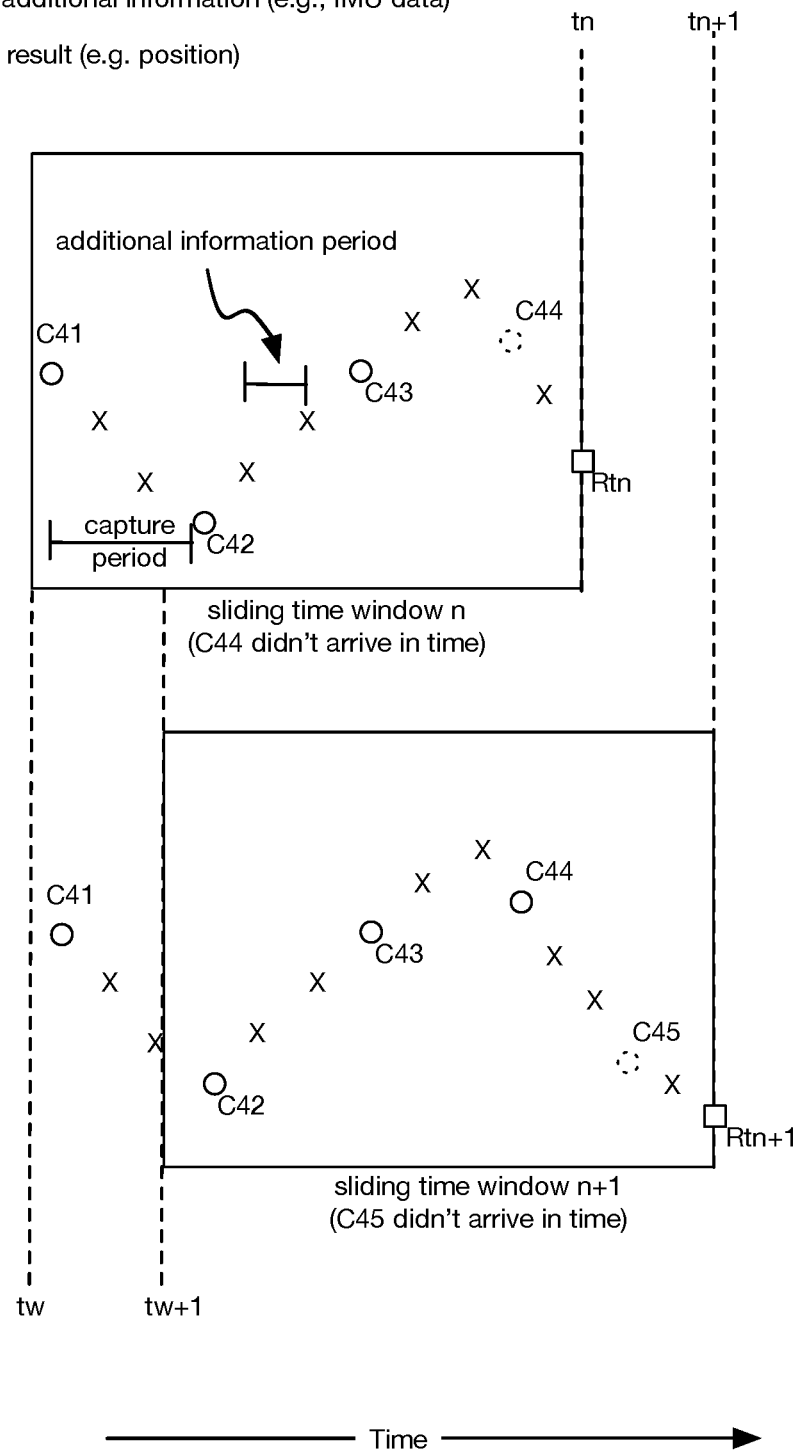
FIG. 8 is a diagram depicting a sensor fusion process, in accordance with embodiments.

As shown in FIG. 8, the tracking system processing device 130 receives IR image data for frames C41, C42 and C43 and 7 additional information frames (e.g., IMU data frames) in sliding time window n, which begins at time $t_w$ and ends at time $t_n$. Although IR image data frame C44 has been generated by the camera 112 before time $t_n$, the tracking system processing device 130 does not receive frame C44 before time $t_n$. In some embodiments, the tracking system processing device 130 estimates the absolute 3-space position at time $t_n$ (Rtn) by using frames C41, C42, C43, and the 7 frames of additional information of window n (by using a moving horizon estimation). In some embodiments, the tracking system processing device 130 estimates the orientation at time $t_n$ (Rtn) by using frames C41, C42, C43, and the 7 frames of additional information of window n (by using a moving horizon estimation).

As shown in FIG. 8, the time between the frame C41 and C42 is the sample period (capture period) of the camera 112. In other words, the capture period is the time between generation of each successive IR image data frame. As shown in FIG. 8, additional information is received between IR image data frames. In other words, the additional information is captured more frequently than IR image data. As shown in FIG. 8, the additional information capture period is shorter than the IR image data capture period.

As shown in FIG. 8, the tracking system processing device 130 receives IR image data for frames C42, C43 and C44 and 7 additional information frames (e.g., IMU data frames) in sliding time window n+1, which begins at time $t_{w+1}$ and ends at time $t_{n+1}$. Although IR image data frame C45 has been generated by the camera 112 before time $t_{n+1}$, the tracking system processing device 130 does not receive frame C45 before time $t_{n+1}$. In some embodiments, the tracking system processing device 130 estimates the absolute 3-space position at time $t_{n+1}$ (Rtn+1) by using frames C42, C43, C44, and the 7 frames of additional information of window n+1 (by using a moving horizon estimation). In some embodiments, the tracking system processing device 130 estimates the orientation at time $t_{n+1}$ (Rtn+1) by using frames C21, C43, C44, and the 7 frames of additional information of window n+1 (by using a moving horizon estimation).

System Architecture

Figure 9:
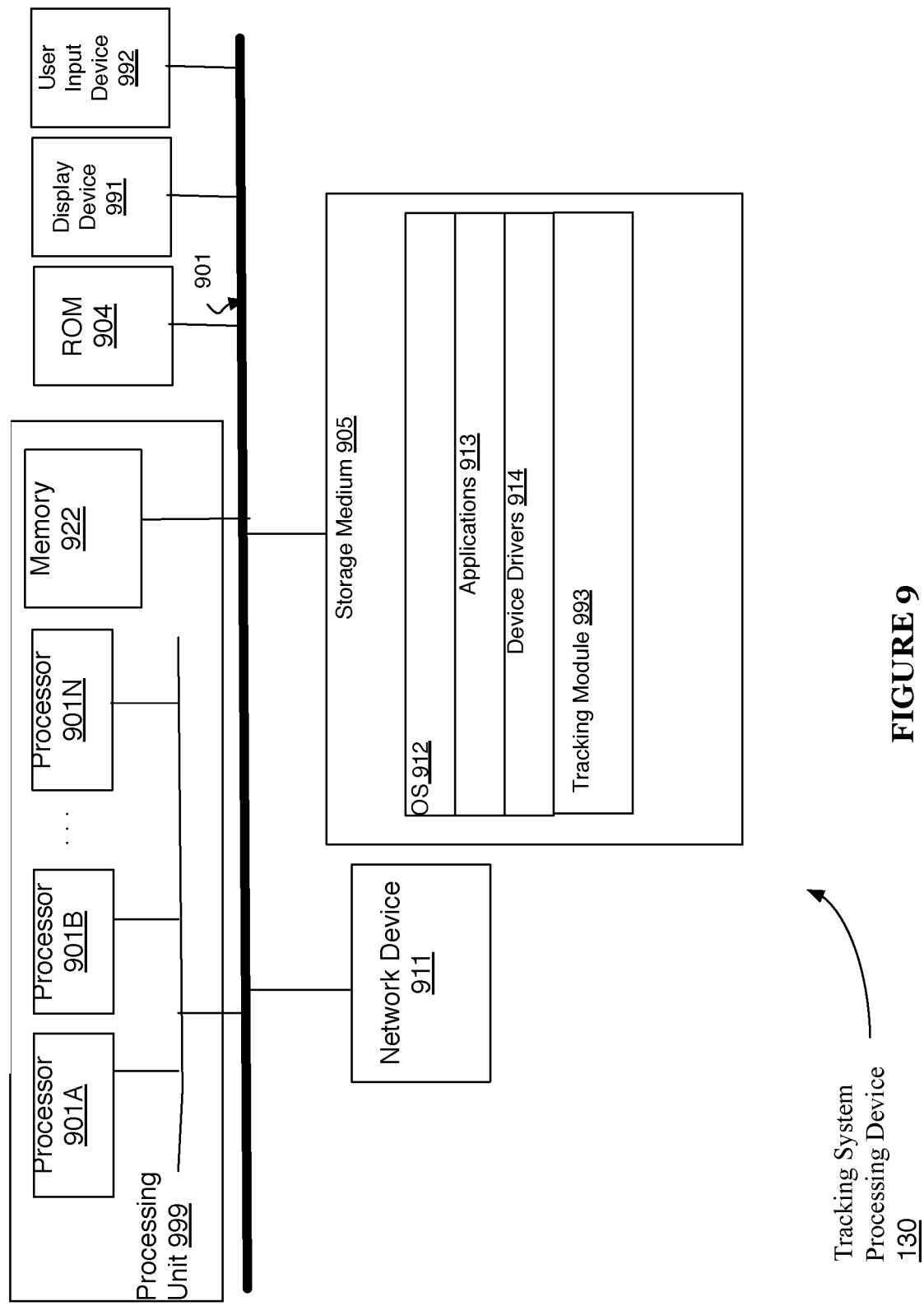
FIG. 9 is an architecture diagram of a tracking system processing device, in accordance with embodiments.

FIG. 9 is an architecture diagram of a tracking system processing device (e.g., 130 of FIG. 1), in accordance with embodiments. In some embodiments, the tracking system processing device includes a display device (e.g., 991). In some embodiments, the display system computing device includes a user input device (e.g., 992). In some embodiments, the tracking system processing device includes at least one processing unit 999 (including one or more processors 901A-901N and a memory 922). In some embodiments, the tracking system processing device includes a ROM 904. In some embodiments, the tracking system processing device includes a bus 901. In some embodiments, the tracking system processing device includes a network device 911. In some embodiments, the tracking system processing device includes a storage device 905. In some embodiments, the storage device 905 includes machine-executable instructions (executable by the processing unit 999) for an operating system 912, applications 913, device drivers 914, and a tracking module 993.

In some embodiments, the tracking module 993 includes machine-executable instructions for one or more of the processes S210, S220, S230, and S240 of FIG. 2. In some embodiments, the tracking module 993 includes machine-executable instructions for one or more of the processes S1110, S1120, S1130, S1140, S1150, and S1160 of FIG. 11. In some embodiments, the tracking module 993 includes machine-executable instructions for one or more of the processes S1410, S1420, S1430, and S1440 of FIG. 14.

In some embodiments, the bus 901 interfaces with the processors 910A-901N, the main memory 922 (e.g., a random access memory (RAM)), the read only memory (ROM) 904, the processor-readable storage medium 905, and the network device 911. In some embodiments, the bus 901 interfaces with at least one of a display device 991 and a user input device 992.

In some embodiments, the processors 901A-901N include one or more of an ARM processor, an X86 processor, a GPU (Graphics Processing Unit), and the like.

In some embodiments, at least one of a central processing unit (processor), a GPU, and a multi-processor unit (MPU) is included.

In some embodiments, the processors 901A-901N and the main memory 922 form a processing unit 999. In some embodiments, the processing unit 999 includes one or more processors 901A-901N communicatively coupled to one or more of a RAM, ROM, and machine-readable storage medium; the one or more processors of the processing unit 999 receive instructions stored by the one or more of a RAM, ROM, and machine-readable storage medium via a bus; and the one or more processors execute the received instructions. In some embodiments, the processing unit 999 is an ASIC (Application-Specific Integrated Circuit). In some embodiments, the processing unit 999 is a SoC (System-on-Chip).

In some embodiments, the network adapter device 911 provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system 912, application programs 913, and device drivers 914) are loaded into the memory 922 (of the processing unit 999) from the processor-readable storage medium 905, the ROM 904 or any other storage location. During execution of these software programs, the respective machine-executable instructions are accessed by at least one of processors (of the processing unit 999) via the bus 901, and then executed by at least one of the processors. Data used by the software programs are also stored in the memory, and such data is accessed by at least one of processors during execution of the machine-executable instructions of the software programs. The processor-readable storage medium 905 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

Figure 10:
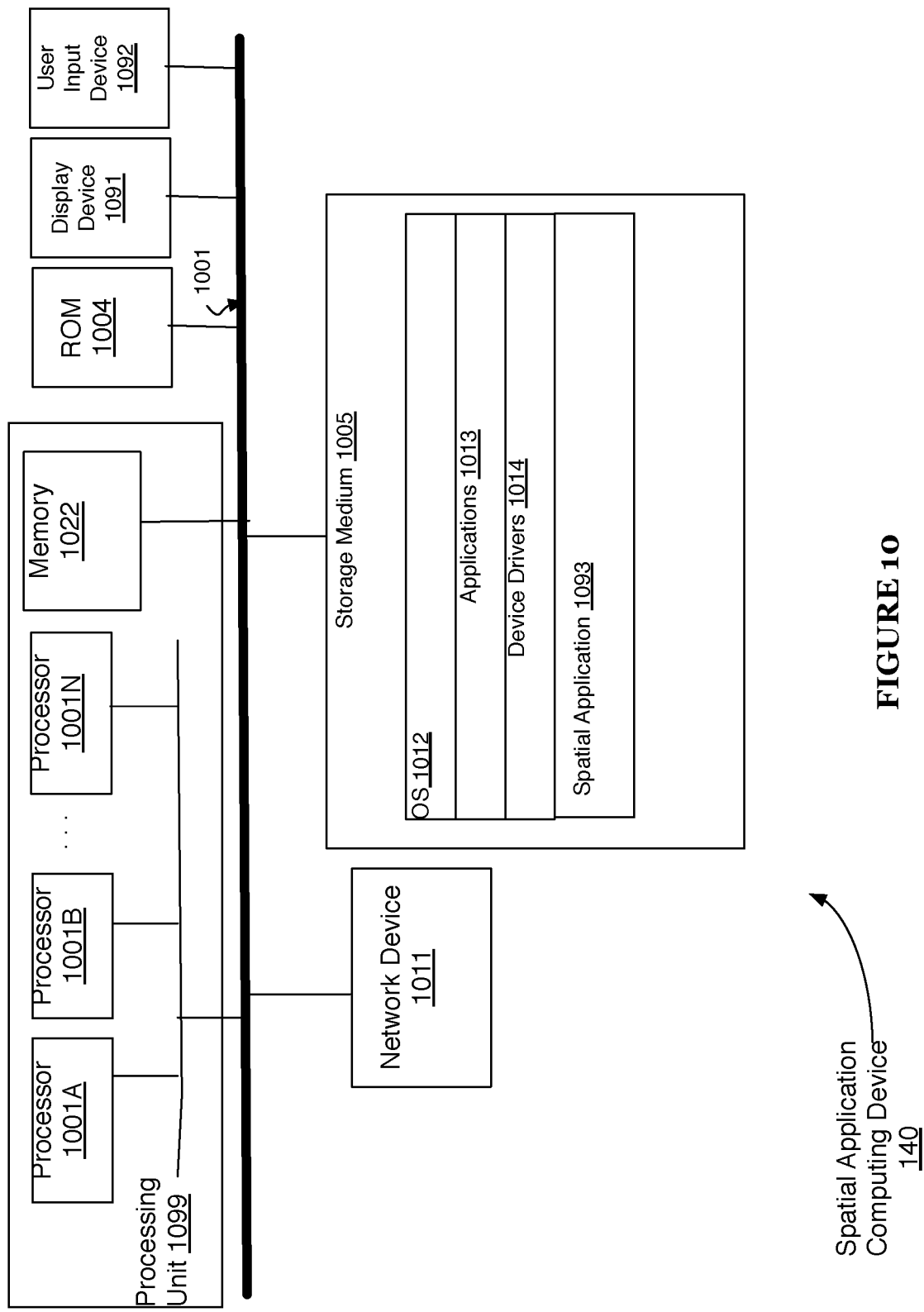
FIG. 10 is an architecture diagram of a spatial application computing device, in accordance with embodiments.

FIG. 10 is an architecture diagram of a spatial application computing device (e.g., 140 of FIG. 1), in accordance with embodiments. In some embodiments, the spatial application computing device includes a display device (e.g., 1091). In some embodiments, the spatial application computing device includes a user input device (e.g., 1092). In some embodiments, the spatial application computing device includes at least one processing unit 1099 (including one or more processors 1001A-1001N and a memory 1022). In some embodiments, the spatial application computing device includes a ROM 1004. In some embodiments, the spatial application computing device includes a bus 1001. In some embodiments, the spatial application computing device includes a network device 1011. In some embodiments, the spatial application computing device includes a storage device 1005. In some embodiments, the storage device 1005 includes machine-executable instructions (executable by the processing unit 1099) for an operating system 1012, applications 1013, device drivers 1014, and a spatial application 1093. In some embodiments, the spatial application 1093 is constructed to update a process based on 3-space position and orientation received by a tracking system processing device (e.g., 130 of FIG. 1) via the network device 1011. In some embodiments, the spatial application 1093 is constructed to update a display device (e.g., 120, 150, 160 of FIG. 1) based on 3-space position and orientation received by a tracking system processing device (e.g., 130 of FIG. 1) via the network device 1011.

In some embodiments, the processors 1001A-1001N and the main memory 1022 form a processing unit 1099. In some embodiments, the processing unit 1099 includes one or more processors 1001A-1001N communicatively coupled to one or more of a RAM, ROM, and machine-readable storage medium; the one or more processors of the processing unit 1099 receive instructions stored by the one or more of a RAM, ROM, and machine-readable storage medium via a bus; and the one or more processors execute the received instructions. In some embodiments, the processing unit 1099 is an ASIC (Application-Specific Integrated Circuit). In some embodiments, the processing unit 1099 is a SoC (System-on-Chip).

In some embodiments, the network adapter device 1011 provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system 1012, application programs 1013, and device drivers 1014) are loaded into the memory 1022 (of the processing unit 1099) from the processor-readable storage medium 1005, the ROM 1004 or any other storage location. During execution of these software programs, the respective machine-executable instructions are accessed by at least one of processors (of the processing unit 1099) via the bus tool, and then executed by at least one of the processors. Data used by the software programs are also stored in the memory, and such data is accessed by at least one of processors during execution of the machine-executable instructions of the software programs. The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

Method 1100

Figure 11:
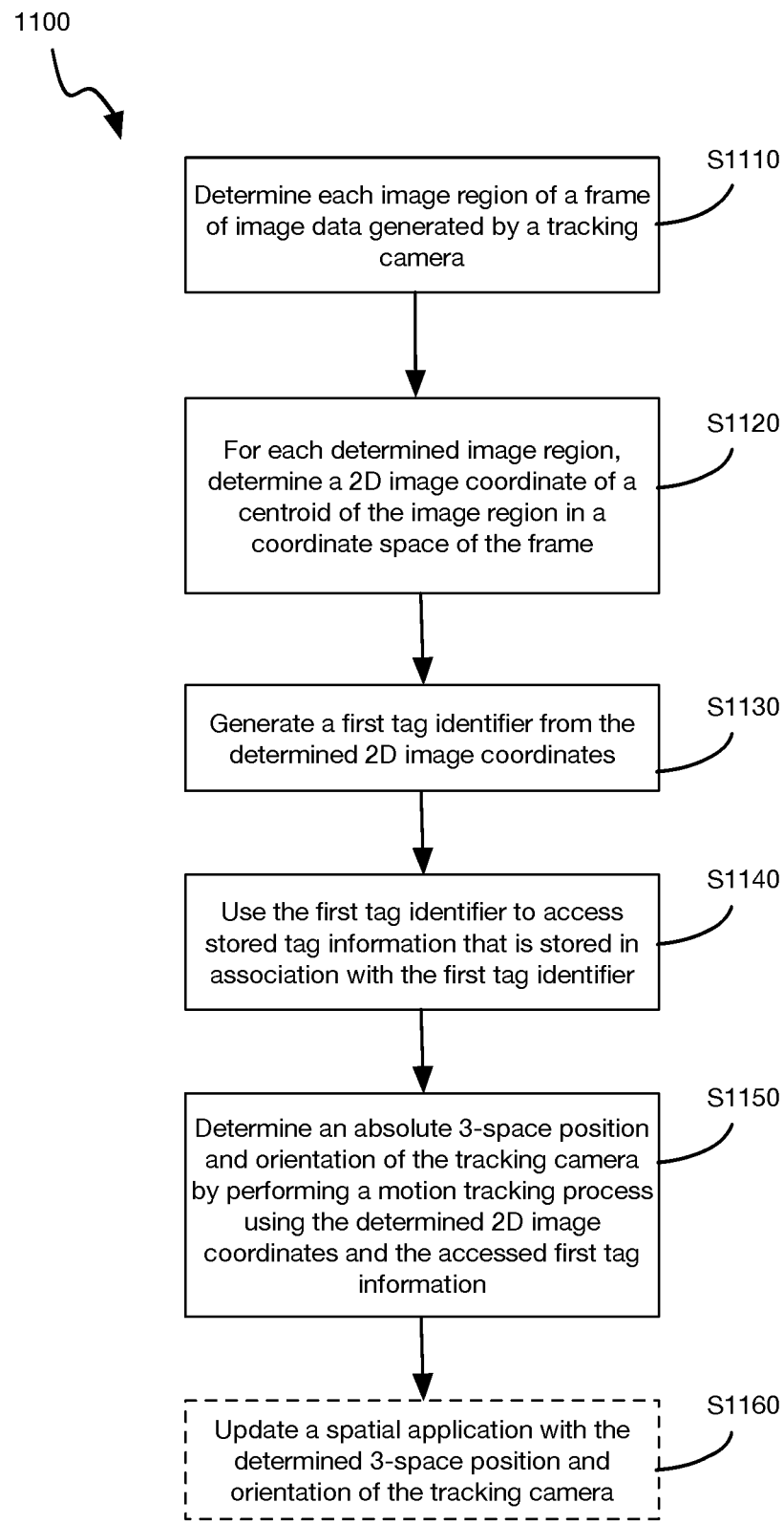
FIG. 11 is a flowchart representation of method, in accordance with embodiments.

FIG. 11 is a flowchart representation of method in accordance with embodiments. The method 1100 of FIG. 11 includes, for each frame of image data generated by a tracking camera: determining each blob of the frame (process S1110); for each determined blob, determining a 2D image coordinate of a centroid of the blob in a coordinate space of the frame (process S1120); a tracking system processor (e.g., 999 of FIG. 9) generating a first tag identifier from the determined 2D image coordinates (process S1130); the tracking system processor using the first tag identifier to access stored first tag information that is stored in association with the first tag identifier (process S1140); and the tracking system processor determining an absolute 3-space position and orientation of the tracking camera by performing a motion tracking process using the determined 2D image coordinates and the accessed first tag information (process S1150).

In some embodiments, in a case where a frame of image data generated by the tracking camera includes blobs for a plurality of tags (e.g., tag 121 and tag 122 of FIG. 1), each blob of the frame is determined, and for each determined blob, a 2D image coordinate of a blob centroid is determined (in a coordinate space of the frame), and a tag identifier (e.g., 1310 and 1320 of FIG. 13) for each of the plurality of tags is generated from the determined 2D image coordinates, as described herein. For each determined tag identifier (each tag identifier corresponding to one of the plurality of tags of the frame), the tracking system processor uses the tag identifier (e.g., 1310, 1320 of FIG. 13) to access stored tag information (e.g., 1301, 1302 of FIG. 13) that is stored in association with the tag identifier; the tracking system processor determines an absolute 3-space position and orientation of the tracking camera by performing a motion tracking process using the determined 2D image coordinates for the plurality of tag identifiers and the tag information accessed by using the plurality of tag identifiers.

In some embodiments, the method 1100 of FIG. 11 includes, for each frame of image data generated by the tracking camera: the tracking system processor (e.g., 999 of FIG. 9) generating a second tag identifier from the determined 2D image coordinates (as described herein for generating the first tag identifier); the tracking system processor using the second tag identifier to access stored second tag information that is stored in association with the second tag identifier (as described herein for generating the first tag identifier). In some embodiments, the tracking system processor determining an absolute 3-space position and orientation of the tracking camera (process S1150) includes: the tracking system processor determining an absolute 3-space position and orientation of the tracking camera by performing a motion tracking process using the determined 2D image coordinates, the accessed first tag information, and the accessed second tag information.

In some embodiments, the method 1100 of FIG. 11 includes, for each frame of image data generated by the tracking camera: the tracking system processor (e.g., 999 of FIG. 9) generating a third tag identifier from the determined 2D image coordinates (as described herein for generating the first tag identifier); the tracking system processor using the third tag identifier to access stored third tag information that is stored in association with the third tag identifier (as described herein for generating the first tag identifier). In some embodiments, the tracking system processor determining an absolute 3-space position and orientation of the tracking camera (process S1150) includes: the tracking system processor determining an absolute 3-space position and orientation of the tracking camera by performing a motion tracking process using the determined 2D image coordinates, the accessed first tag information, the accessed second tag information, and the accessed third tag information.

In some embodiments, the method 1100 of FIG. 11 includes, for each frame of image data generated by the tracking camera: the tracking system processor (e.g., 999 of FIG. 9) generating a fourth tag identifier from the determined 2D image coordinates (as described herein for generating the first tag identifier); the tracking system processor using the fourth tag identifier to access stored fourth tag information that is stored in association with the fourth tag identifier (as described herein for generating the first tag identifier). In some embodiments, the tracking system processor determining an absolute 3-space position and orientation of the tracking camera (process S1150) includes: the tracking system processor determining an absolute 3-space position and orientation of the tracking camera by performing a motion tracking process using the determined 2D image coordinates, the accessed first tag information, the accessed second tag information, the accessed third tag information, and the accessed fourth tag information.

In some embodiments, the method 1100 of FIG. 11 includes, for each frame of image data generated by the tracking camera, the tracking system processor (e.g., 999 of FIG. 9) generating a fifth through Nth tag identifier by analogy to and extension of the approach detailed in [0085] through [0088].

In some embodiments, the second tag identifier is generated responsive to a determination that the 2D image coordinates includes a number of image coordinates greater than a predetermined tag element amount. In some embodiments, the tag element amount is 6.

In some embodiments, each tag includes a predetermined number of elements, and in a case where a number of 2D coordinates corresponding to two tags is determined, the second tag identifier is generated. In some embodiments, in a case where a number of 2D coordinates corresponding to three tags is determined, the second tag identifier is generated and the third tag identifier is generated. In some embodiments, in a case where a number of 2D coordinates corresponding to four tags is determined, the second tag identifier is generated, the third tag identifier is generated, and the fourth tag identifier is generated.

In some embodiments, the method 1100 is performed in real-time.

In some embodiments, the method 1100 includes updating a spatial application with the determined absolute 3-space position and orientation of the tracking camera (process S1160). In some embodiments, process S1160 includes updating a spatial application with the determined absolute 3-space position and orientation of the tracking camera by providing the determined absolute 3-space position and orientation of the tracking camera to a spatial application computing device (e.g., 140 of FIGS. 1 and 1C)).

In some embodiments, each blob of the first frame is determined by using the tracking system processor. In some embodiments, the 2D image coordinates are determined by the tracking system processor. In some embodiments, the tracking system processor is included in a tracking system (e.g., 130 of FIGS. 1 and 9). In some embodiments, the tracking system processor is included in a user input device (e.g., 110 of FIG. 1). In some embodiments, the tracking system processor is included in a mobile computing device. In some embodiments, each blob of the first frame is determined by using an image processor (e.g., 113 of FIG. 1). In some embodiments, the 2D image coordinates are determined by an image processor. In some embodiments, the image processor is included in a tracking system. In some embodiments, the image processor is included in user input device (e.g., 110 of FIG. 1). In some embodiments, the image processor is included in a mobile computing device.

In some embodiments, each blob of the frame is determined by using a computer vision module. In some embodiments, each blob of the frame is determined by using the OpenCV (Open Source Computer Vision) library. In some embodiments, each 2D image coordinate of a centroid is determined by using a computer vision module. In some embodiments, each 2D image coordinate of a centroid is determined by using the OpenCV (Open Source Computer Vision) library.

In some embodiments, a mobile computing device (e.g., and Android device, an iOS device) performs the processes S1110, S1120, S1130, S1140 and S1150. In some embodiments, the mobile computing device performs the processes S1160.

In some embodiments, a user input device (e.g., 110 of FIG. 1) performs the processes S1110, S1120. In some embodiments, the user input device includes an image processor (e.g., 113 of FIG. 1) that is constructed to perform real-time edge detection, and the user input device performs the processes S1110 by using the image processor. In some embodiments, the user input device includes an image processor that is constructed to perform real-time feature detection, and the user input device performs the processes S1110 by using the image processor. In some embodiments, the user input device includes an image processor that is constructed to perform real-time feature extraction, and the user input device performs the processes S1110 by using the image processor. In some embodiments, the user input device performs the process S1130. In some embodiments, the user input device performs the process S1140. In some embodiments, the user input device performs the process S1150. In some embodiments, the user input device performs the processes S1160.

In some embodiments, a tracking system processing device (e.g., and 130 of FIG. 1) performs the processes S1110, S1120. In some embodiments, the tracking system processing device includes a processor that is constructed to perform real-time edge detection, and the tracking system processing device performs the processes Silo by using the processor. In some embodiments, the tracking system processing device includes a processor that is constructed to perform real-time feature detection, and the tracking system processing device performs the processes S1110 by using the processor. In some embodiments, the tracking system processing device includes a processor that is constructed to perform real-time feature extraction, and the tracking system processing device performs the processes S1110 by using the processor. In some embodiments, the tracking system processing device performs the process S1130. In some embodiments, the tracking system processing device performs the process S1140. In some embodiments, the tracking system processing device performs the process S1150. In some embodiments, the tracking system processing device performs the processes S1160.

Tracking System

In some embodiments, the method 1100 is performed by a tracking system. In some embodiments, at least one process of the method 1100 is performed by a tracking system. In some embodiments, the tracking system is a tracking system processing device that is similar to the tracking system processing device 130 of FIGS. 1 and 10.

In some embodiments, the tracking system includes the tracking system processor.

In some embodiments, the tracking system includes the tracking camera. In some embodiments, the tracking system is communicatively coupled to the tracking camera, and the tracking camera is external to the tracking system. In some embodiments, the tracking camera is included in a user input device that is external to the tracking system and that is communicatively coupled to the tracking system. In some embodiments, the tracking system is communicatively coupled to the user input device via a network device (e.g., 911 of FIG. 9) of the tracking system. In some embodiments, the tracking camera is included in a mobile computing device that is external to the tracking system and that is communicatively coupled to the tracking system. In some embodiments, the tracking system is communicatively coupled to the mobile computing device via a network device (e.g., 911 of FIG. 9) of the tracking system.

In some embodiments, the tracking system includes a user input device similar to the user input device 110 of FIG. 1 and a tracking system processing device that is similar to the tracking system processing device 130 of FIGS. 1 and 10. In some embodiments, the tracking system includes a user input device similar to the user input device 110 of FIG. 1 and a tracking system processing device that is similar to the tracking system processing device 130 of FIGS. 1 and 10, wherein the user input device performs at least one process of the method 1100 and the tracking system processing device performs at least one process of the method 1100. In some embodiments, the tracking system is a mobile computing device. In some embodiments, the tracking system is an iOS computing device. In some embodiments, the tracking system is an Android computing device.

In some embodiments, the tracking system is included in a mobile computing device that includes the tracking camera.

Tracking Camera

In some embodiments, the tracking camera includes an infrared (IR) transmitting filter. In some embodiments, the IR transmitting filter is similar to the IR filter 111 of FIG. 1. In some embodiments, the IR transmitting filter is constructed to transmit an IR wavelength. In some embodiments, the IR transmitting filter is constructed to block visible light.

In some embodiments, the IR transmitting filter is constructed to block visible light and transmit an IR wavelength emitted by an infrared (IR) emitter.

In some embodiments, the IR transmitting filter is constructed to block visible light and transmit an IR wavelength reflected by a retroreflective marker.

In some embodiments, the tracking camera includes an image sensor. In some embodiments, the image sensor is similar to the camera 112 of FIG. 1. In some embodiments, the image sensor is constructed to sense an IR wavelength transmitted by an IR transmitting filter, and generate IR image data for the sensed IR wavelength. In some embodiments, the image sensor (e.g., 112 of FIG. 1) is constructed to sense an IR wavelength transmitted by an IR transmitting filter (e.g., 111 of FIG. 1) of the tracking camera, and generate IR image data for the sensed IR wavelength.

In some embodiments, the tracking camera includes an image processor. In some embodiments, the image processor is similar to the image processor 113 of FIG. 1. In some embodiments, each blob of the first frame is determined by using the image processor of the tracking camera. In some embodiments, the 2D image coordinates are determined by the image processor of the tracking camera.

In some embodiments, the tracking camera includes a communication interface. In some embodiments, the communication interface is similar to the communication interface 114 of FIG. 1.

Determining Each Blob of the Frame (Process S1110)

In some embodiments, each blob is a bright region having image points with image brightness values above a threshold brightness value.

In some embodiments, each blob is a group of one or more image points having a non-black color value.

In some embodiments, each blob is a group of one or more image points having an image brightness value above a predetermined threshold value.

In some embodiments, each blob is a group of one or more image points of the first frame having a non-dark image brightness value.

In some embodiments, determining each blob of the frame includes: determining each blob of the frame by performing an edge detection process.

In some embodiments, determining each blob of the frame includes: determining each blob of the frame by performing a feature detection process.

In some embodiments, determining each blob of the frame includes: determining each blob of the frame by performing a feature extraction process.

In some embodiments, each blob corresponds to sensing of an emission of IR light from an IR emitter. In some embodiments, each blob corresponds sensing of IR light reflected by a retroreflective marker. In some embodiments, each blob is an IR point.

By virtue of sensing IR light via an IR filter that is constructed to block visible light and transmit IR light, identification of IR points can be more easily performed. For example, by virtue of sensing IR light via an IR filter that is constructed to block visible light and transmit IR light (one or more IR wavelengths) emitted by an IR emitter (or reflected by a retroreflective marker constructed to reflect IR light), the resulting image is a dark image that includes bright areas corresponding to sensed IR light. Accordingly, bright regions of the generated image correspond to sensed IR light, and thus each point of IR light is identified by identifying bright areas of the IR image, and each 2D coordinate is determined by determining a 2D coordinate for each centroid of each bright area of the IR image.

By virtue of sensing IR light via an IR filter that is constructed to block visible light and transmit IR light, in an environment where tracking tags used by the tracking system are constructed to emit or reflect IR light, bright regions of image frames can be assumed to be regions corresponding to locations of tracking tags.

Generating a First Tag Identifier (Process S1130): 3-Point Line Sets

Candidate Sets

In some embodiments, generating a first tag identifier from the determined 2D image coordinates includes: selecting a first 2D image coordinate (e.g., P1 of FIG. 7) of the plurality of 2D image coordinates, determining the five closest other 2-D coordinates (e.g., P2-P6) of the plurality of 2-D image coordinates, and determining whether a first candidate set that includes the first 2D coordinate and the five closest other 2D coordinates includes a first sub-set of 2D image coordinates that form a first straight line and a second sub-set of 2D image coordinates that form a second straight line.

Candidate Sets: Intersecting Lines

In some embodiments, generating a first tag identifier from the determined 2D image coordinates includes: selecting a first 2D image coordinate (e.g., Pt of FIG. 7) of the plurality of 2D image coordinates, determining the five closest other 2-D coordinates (e.g., P2-P6) of the plurality of 2-D image coordinates, and determining whether a first candidate set that includes the first 2D coordinate and the five closest other 2D coordinates includes a first sub-set of 2D image coordinates that form a first straight line and a second sub-set of 2D image coordinates that form a second straight line, wherein the first straight line intersects the second straight line.

Selecting a Candidate Set

Responsive to a determination that the first candidate set includes a first sub-set of 2D image coordinates that form a first straight line and a second sub-set of 2D image coordinates that form a second straight line, the first tag identifier is generated by using the 2D image coordinates of the first candidate set.

Responsive to a determination that the first candidate set does not include a first sub-set of 2D image coordinates that form a first straight line and a second sub-set of 2D image coordinates that form a second straight line, a second candidate set is formed by selecting a second 2D image coordinate of the plurality of 2D image coordinates and the five closest other 2-D image coordinates, and a determination is made as to whether the second candidate set includes a first sub-set of 2D image coordinates that form a first straight line and a second sub-set of 2D image coordinates that form a second straight line. In some embodiments, the process of forming candidate sets is repeated until a candidate set is found that includes a first sub-set of 2D image coordinates that form a first straight line and a second sub-set of 2D image coordinates that form a second straight line.

Generating the Tag Identifier Using the Selected Candidate Set

In some embodiments, generating the first tag identifier by using the 2D image coordinates of the first candidate set includes: determining a first intersection coordinate of an intersection between the first straight line and the second straight line; determining a first cross ratio by using the three coordinates of the first sub-set and the first intersection coordinate; determining a second cross ratio by using the three coordinates of the second sub-set and the first intersection coordinate, wherein the first tag identifier is a pair that includes the first cross ratio and the second cross ratio.

In some embodiments, generating the first tag identifier by using the 2D image coordinates of the first candidate set includes: determining a first intersection coordinate of an intersection between the first straight line and the second straight line; determining a first cross ratio by using the three coordinates of the first sub-set and the first intersection coordinate; determining a second cross ratio by using the three coordinates of the second sub-set and the first intersection coordinate; determining a first vector cross product of the first straight line and the second straight line; responsive to a determination that the first vector cross product is a positive value, forming a first ordered pair that includes the first cross ratio as a first value of the first ordered pair and that includes the second cross ratio as a second value of the first ordered pair, wherein the first tag identifier is the first ordered pair; and responsive to a determination that the first vector cross product is a negative value, forming a second ordered pair that includes the second cross ratio as a first value of the second ordered pair and that includes the first cross ratio as a second value of the second ordered pair, wherein the first tag identifier is the second ordered pair.

In some embodiments, generating the first tag identifier by using the 2D image coordinates of the first candidate set includes: determining a first intersection coordinate of an intersection between the first straight line and the second straight line; determining a first cross ratio by using the three coordinates of the first sub-set and the first intersection coordinate; determining a second cross ratio by using the three coordinates of the second sub-set and the first intersection coordinate; determining a first vector cross product of the first straight line and the second straight line; responsive to a determination that the first vector cross product is a positive value, forming a first ordered pair that includes the second cross ratio as a first value of the first ordered pair and that includes the first cross ratio as a second value of the first ordered pair, wherein the first tag identifier is the first ordered pair; and responsive to a determination that the first vector cross product is a negative value, forming a second ordered pair that includes the first cross ratio as a first value of the second ordered pair and that includes the second cross ratio as a second value of the second ordered pair, wherein the first tag identifier is the second ordered pair.

For example, as described above for FIG. 7, a tag identifier for 2D image coordinates for the points P1, P2, P3, P4, P5, P6, having an intersection point P0, is generated as follows: a 2D coordinate of an intersection point P0 is determined, and the first cross ratio of the first line set is determined as shown in Equation 1:

$$\frac{P1P3 \cdot P2P0}{P1P0 \cdot P2P3};$$

the second cross ratio of the second line set is determined as shown in Equation 2:

$$\frac{P0P5 \cdot P4P6}{P0P6 \cdot P4P5};$$

the vector cross product (P0−P1)×(P6−P0) is determined; responsive to a determination that the vector cross product is greater than zero, the ordered pair is generated by including the first cross ratio as the first value and the second cross ratio as the second value $$\left(\frac{P1P3 \cdot P2P0}{P1P0 \cdot P2P3}, \frac{P0P5 \cdot P4P6}{P0P6 \cdot P4P5}\right);$$

responsive to a determination that the vector cross product is less than zero, the ordered pair is generated by including the second cross ratio as the first value and the first cross ratio as the second value $$\left(\frac{P0P5 \cdot P4P6}{P0P6 \cdot P4P5}, \frac{P1P3 \cdot P2P0}{P1P0 \cdot P2P3}\right).$$

Figure 12:
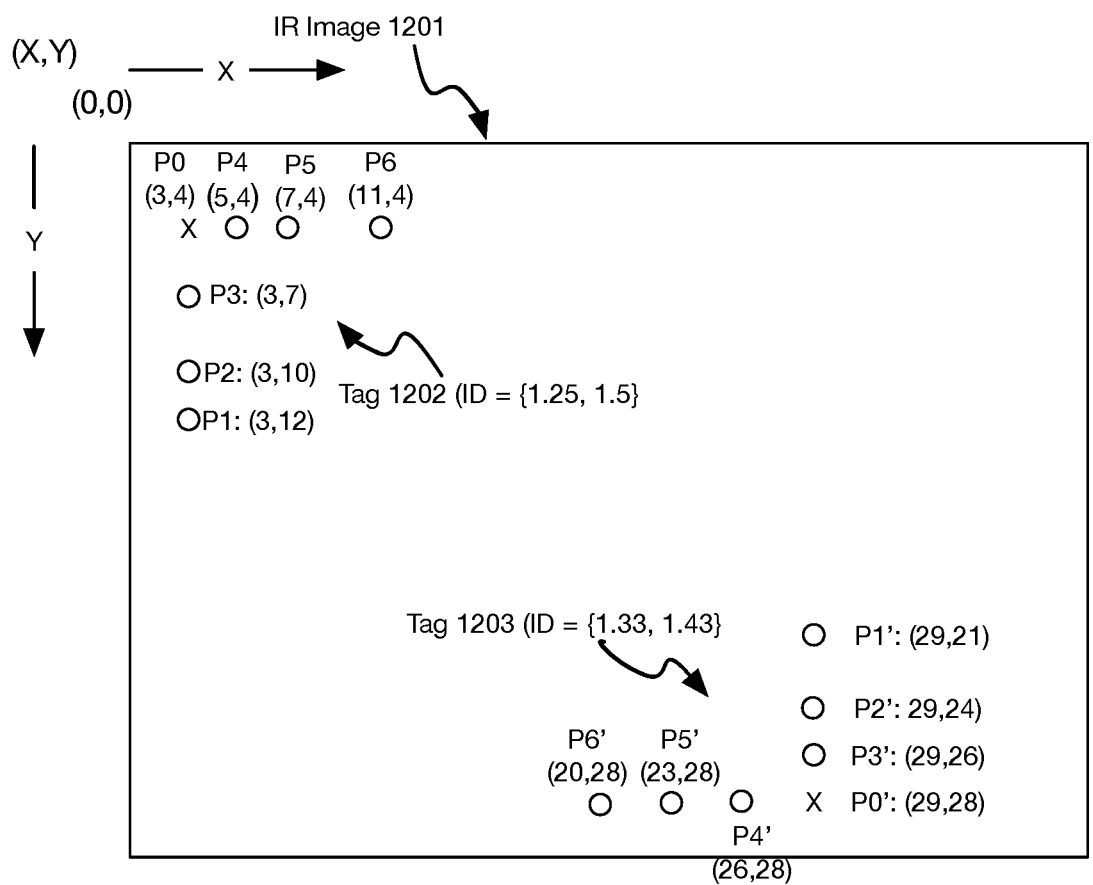
FIG. 12 is a diagram depicting a process for determining tag identifier, in accordance with embodiments.

FIG. 12 shows example 2D coordinates for points P1, P2, P3, P4, P5, P6 of image 1201 for a tag 1202, and intersection point P0. The first cross ratio of the first line set is determined as shown in Equation 1:

$$\frac{P1P3 \cdot P2P0}{P1P0 \cdot P2P3} = \frac{5 \cdot 6}{8 \cdot 3} = 1.25;$$

the second cross ratio of the second line set is determined as shown in Equation 2:

$$\frac{P0P5 \cdot P4P6}{P0P6 \cdot P4P5} = \frac{4 \cdot 6}{8 \cdot 2} = 1.5;$$

the vector cross product (P0−P1)×(P6−P0)=(8×8) sin (90 degrees)=(64)×1=64. Since the vector cross product (64) is greater than zero, the ordered pair is $$\left(\frac{P1P3 \cdot P2P0}{P1P0 \cdot P2P3}, \frac{P0P5 \cdot P4P6}{P0P6 \cdot P4P5}\right)$$

=(1.25, 1.5), which is the tag identifier for the tag 1202. In some embodiments, the first tag information is stored in association with the first tag identifier (1.25, 1.5), such that the first tag information can be accessed by performing a lookup using the first tag identifier (1.25, 1.5). In some embodiments, the lookup is a database lookup. In some embodiments, the lookup is a lookup table lookup. In some embodiments, the lookup is a hash lookup.

FIG. 12 shows example 2D coordinates for points P1', P2', P3', P4', P5', P6' of image 1201 for a tag 1203, and intersection point P0'. The first cross ratio of the first line set is determined as shown in Equation 1:

$$\frac{P1'P3' \cdot P2'P0'}{P1'P0' \cdot P2'P3'} = \frac{5 \cdot 4}{7 \cdot 2} = 1.43;$$

the second cross ratio of the second line set is determined as shown in Equation 2:

$$\frac{P0'P5' \cdot P4'P6'}{P0'P6' \cdot P4'P5'} = \frac{6 \cdot 6}{9 \cdot 3} = 1.33;$$

the vector cross product (P0'−P1')×(P6'−P0')=(7×9) sin (270 degrees)=(63)×(−1)=−63. Since the vector cross product (−63) is less than zero, the ordered pair is $$\left(\frac{P0'P5' \cdot P4'P6'}{P0'P6' \cdot P4'P5'}, \frac{P1'P3' \cdot P2'P0'}{P1'P0' \cdot P2'P3'}\right) = (1.33, 1.43),$$

which is the tag identifier for the tag 1203. In some embodiments, second tag information is stored in association with the second tag identifier (1.33, 1.43), such that the second tag information can be accessed by performing a lookup using the second tag identifier (1.33, 1.43). In some embodiments, the lookup is a database lookup. In some embodiments, the lookup is a lookup table lookup. In some embodiments, the lookup is a hash lookup.

Generating Additional Tag Identifiers: 3-Point Line Sets

In some embodiments, in a case where a frame of image data generated by the tracking camera includes blobs for a plurality of tags (e.g., tag 121 and tag 122 of FIG. 1), each blob of the frame is determined, and for each determined blob, a 2D image coordinate of a blob centroid is determined (in a coordinate space of the frame), and a tag identifier (e.g., 1310 and 1320 of FIG. 13) for each of the plurality of tags is generated from the determined 2D image coordinates, as described herein.

In some embodiments, generating a second tag identifier from the determined 2D image coordinates includes: selecting a first 2D image coordinate from the coordinate set of 2D coordinates that is the original set of plurality of 2D image coordinates excluding the 2D image coordinates used to generate the first tag identifier, determining the five closest other 2-D coordinates of the coordinate set, and determining whether a first candidate set that includes the first 2D coordinate and the five closest other 2D coordinates of the coordinate set includes a first sub-set of 2D image coordinates that form a first straight line and a second sub-set of 2D image coordinates that form a second straight line.

Responsive to a determination that the first candidate set includes a first sub-set of 2D image coordinates that form a first straight line and a second sub-set of 2D image coordinates that form a second straight line, the second tag identifier is generated by using the 2D image coordinates of the first candidate set, as described herein for the first tag identifier Responsive to a determination that the first candidate set does not include a first sub-set of 2D image coordinates that form a first straight line and a second sub-set of 2D image coordinates that form a second straight line, a second candidate set is formed by selecting a second 2D image coordinate of the coordinate set and the five closest other 2-D image coordinates, and a determination is made as to whether the second candidate set includes a first sub-set of 2D image coordinates that form a first straight line and a second sub-set of 2D image coordinates that form a second straight line. In some embodiments, the process of forming candidate sets for the second tag identifier is repeated until a candidate set is found that includes a first sub-set of 2D image coordinates that form a first straight line and a second sub-set of 2D image coordinates that form a second straight line.

In some embodiments, the process described herein for generating the first tag identifier is repeated for a third tag identifier.

In some embodiments, the process described herein for generating the first tag identifier is repeated for a fourth tag identifier.

In some embodiments, the process described herein for generating the first tag identifier is repeated for fifth through Nth tag identifiers, through natural extension of the process detailed in [0129] through [0135].

Determining an Absolute 3-Space Position and Orientation of the Tracking Camera: 3-Space Coordinates for Each 2D Image Coordinate In some embodiments, the first tag information (e.g., 1301 of FIG. 13) includes 3-space coordinates for each 2D image coordinate (e.g., the coordinates of points P0, P1, P2, P3, P4, P5, and P6 of FIG. 12) used to generate the first tag identifier (e.g., 1310 of FIG. 13); and determining an absolute 3-space position and orientation of the tracking camera by performing a motion tracking process includes: performing the motion tracking process by using the 2D image coordinates used to generate the first tag identifier and the accessed 3-space coordinates for each 2D image coordinate used to generate the first tag identifier. In some embodiments, stored camera information of the tracking camera is accessed and used to perform the motion tracking process.

Figure 13:
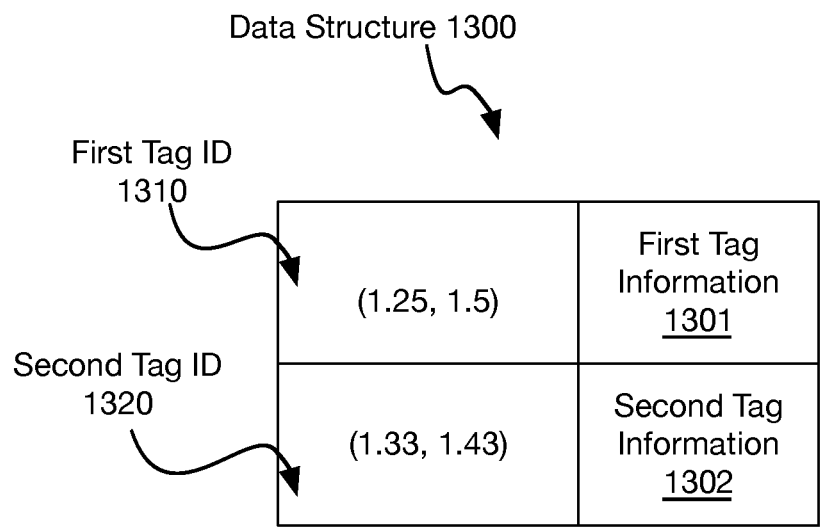
FIG. 13 is a representation of a data structure, in accordance with embodiments.

Referring to FIG. 13, in some embodiments, the first tag information 1301 includes 3-space coordinates for each 2D image coordinate used to generate the first tag identifier 1310. In some embodiments, the first tag information 1301 includes 3-space coordinates that correspond to points P1, P2, P3, P4, P5 and P6, of FIG. 12. In some embodiments, each 3-space coordinate of the first tag information 1301 is a 3-space coordinate of a tag element of a first tag (e.g., an element of tag 121 of FIG. 1). In some embodiments, each tag element of the first tag is an IR emitter. In some embodiments, each tag element of the first tag is an IR reflector.

In some embodiments, the first tag information includes 3-space coordinates for each 2D image coordinate used to generate the first tag identifier (e.g., 1310 of FIG. 13); the second tag information includes 3-space coordinates for each 2D image coordinate used to generate the second tag identifier and determining an absolute 3-space position and orientation of the tracking camera by performing a motion tracking process includes: performing the motion tracking process by using the 2D image coordinates used to generate the first tag identifier and the corresponding ones of the accessed 3-space coordinates for each 2D image coordinate used to generate the first tag identifier, and the 2D image coordinates used to generate the second tag identifier and the corresponding ones of the accessed 3-space coordinates for each 2D image coordinate used to generate the second tag identifier.

In some embodiments, 3 tag identifiers are used, and performing the motion tracking process includes using each 2D coordinate of the 3 tag identifiers, and the corresponding 3-space coordinates accessed from a storage device by using the 3 tag identifiers.

In some embodiments, 4 tag identifiers are used, and performing the motion tracking process includes using each 2D coordinate of the 4 tag identifiers, and the corresponding 3-space coordinates accessed from a storage device by using the 4 tag identifiers.

Determining an Absolute 3-Space Position and Orientation of the Tracking Camera: Tag Spacing Information In some embodiments, a first tag includes a plurality of tag elements. In some embodiments, each tag element is a retroreflective marker that is constructed to reflect at least one IR wavelength. In some embodiments, the tracking camera includes an IR emitter that is constructed to emit at least one IR wavelength. In some embodiments, each tag element is an IR emitter that is constructed to emit at least one IR wavelength.

In some embodiments, the first tag information (e.g., 1301 of FIG. 13) includes a 3-space coordinate for a first tag (e.g., tag 1202 of FIG. 12) that corresponds to the first tag identifier (e.g., 1310 of FIG. 13); the first tag includes a plurality of tag elements, and each 2D coordinate used to generate the first tag identifier corresponds to one of the plurality of tag elements of the first tag; the first tag information includes spacing information for the tag elements of the first tag; and determining an absolute 3-space position and orientation of the tracking camera by performing a motion tracking process includes: determining a 3-space coordinate for each 2D coordinate used to generate the first tag identifier by using the 3-space coordinate of the first tag and the spacing information; performing the motion tracking process by using the 2D image coordinates used to generate the first tag identifier and the determined 3-space coordinates for each 2D image coordinate used to generate the first tag identifier. In some embodiments, stored camera information of the tracking camera is accessed and used to perform the motion tracking process. In some embodiments, the 3-space coordinate for a first tag corresponds to the intersection point of the two lines of the first tag (e.g., P0 of FIG. 12).

Referring to FIG. 13, in some embodiments, the first tag information 1301 includes 3-space coordinates for a first tag, and spacing information for each 2D image coordinate used to generate the first tag identifier 1310. In some embodiments, the first tag information 1301 includes a 3-space coordinate that corresponds to intersection point P0, of FIG. 12.

In some embodiments, 2 tag identifiers are used, and a 3-space coordinate for each 2D coordinate used to generate a second tag identifier is determined by using a 3-space coordinate of the second tag and spacing information, in a manner similar to that described above for the first tag identifier; and performing the motion tracking process includes using each 2D coordinate of the 2 tag identifiers, and the corresponding determined 3-space coordinates.

In some embodiments, 3 tag identifiers are used, a 3-space coordinate for each 2D coordinate used to generate a second tag identifier is determined as described above for the first tag identifier, and a 3-space coordinate for each 2D coordinate used to generate a third tag identifier is determined as described above for the first tag identifier; and performing the motion tracking process includes using each 2D coordinate of the 3 tag identifiers, and the corresponding determined 3-space coordinates.

In some embodiments, 4 tag identifiers are used, a 3-space coordinate for each 2D coordinate used to generate a second tag identifier is determined as described above for the first tag identifier, a 3-space coordinate for each 2D coordinate used to generate a third tag identifier is determined as described above for the first tag identifier, and a 3-space coordinate for each 2D coordinate used to generate a fourth tag identifier is determined as described above for the first tag identifier; and performing the motion tracking process includes using each 2D coordinate of the 4 tag identifiers, and the corresponding determined 3-space coordinates.

Tag Information Data Structure

In some embodiments, the first tag information 1301 is included in a data structure 1300 that associates the first tag information 1301 with the first tag identifier 1310. In some embodiments, the second tag information 1302 is included in the data structure 1300, and the data structure 1300 associates the second tag information 1301 with the second tag identifier 1320. In some embodiments, a storage device (e.g., 905 of FIG. 9) of a tracking system processing device stores the data structure 1300. In some embodiments, a user input device (e.g., 110 of FIG. 1) stores the data structure 1300. In some embodiments, a mobile computing device stores the data structure 1300.

In some embodiments, the data structure 1300 is a database data structure. In some embodiments, the data structure 1300 is a lookup table data structure. In some embodiments, the data structure 1300 is a hash table data structure. In some embodiments, the data structure 1300 is a linked-list data structure.

In some embodiments, the data structure 1300 is populated by using an off-line computational process that generates a fixed plurality of individual tag geometries with the property that their cross ratios are distributed throughout a configuration space in such a way that each tag is optimally distinguishable from all the rest. In such an embodiment, physical tags are generated from the precomputed tag geometries, and a subsequent one-time calibration process is used to refine the data structure 1300 so that its tag identifiers (e.g., 1310 and 1320 of FIG. 13) most accurately match the physically manifest tags.

In some embodiments, the data structure 1300 is populated during a configuration process that is performed prior to performing the motion tracking process. In some embodiments, the data structure 1300 is populated by generating a frame of image data that represents an image of the first tag (e.g., 121 of FIG. 1) by using the tracking camera, generating a tag identifier (e.g., 1310 of FIG. 13) for the first tag (as described herein), storing the tag identifier in the data structure 1300, determining a 3-space position of the first tag, and storing the 3-space position in the data structure 1300 in association with the first tag as tag information (e.g., 1301 of FIG. 13). In some embodiments, the 3-space position of the first tag is measured manually. In some embodiments, the 3-space position of the first tag is determined automatically by capturing at least one image of the first tag by using a camera (e.g., the tracking camera, another camera, etc.) and processing the image by using an image processor. In some embodiments, the 3-space position of the first tag is determined automatically by performing a bundle adjustment process. In some embodiments, during the configuration process, spacing information for the first tag is stored in the data structure 1300 in association with the first tag identifier (e.g., as tag information 1301 of FIG. 13). In some embodiments, the spacing information for the first tag is measured manually.

In some embodiments, the data structure 1300 is populated by generating a frame of image data that represents an image of the first tag by using the tracking camera, generating a tag identifier (e.g., 1310 of FIG. 13) for the first tag (as described herein), storing the tag identifier in the data structure 1300, determining a 3-space position for each tag element of the first tag, and storing the 3-space position for each tag element in the data structure 1300 in association with the first tag (e.g., as tag information 1301 of FIG. 13). In some embodiments, the 3-space position of each element of the first tag is measured manually. In some embodiments, the 3-space position of each element of the first tag is determined automatically by capturing at least one image of the first tag by using a camera (e.g., the tracking camera, another camera, etc.) and processing the image by using an image processor. In some embodiments, the 3-space position of each element of the first tag is determined automatically by performing a bundle adjustment process.

In some embodiments, each element is an IR emitter. In some embodiments, each element is an IR reflector. In some embodiments, each element is a light emitter. In some embodiments, each element is a light reflector.

Motion Tracking: Perspective n-Point

In some embodiments, the method 1100 includes using the first tag information to determine 3-space coordinates for each 2D image coordinate used to generate the first tag identifier. In some embodiments, the first tag information includes 3-space coordinates for each 2D image coordinate used to generate the first tag identifier.

In some embodiments, the motion tracking process is a Perspective n-point process.

Motion Tracking: Single Frame

In some embodiments, for each frame of image data generated by the tracking camera, the motion tracking process includes: generating a first simulated camera image by using the determined 2D image coordinates and the 3-space coordinates for each 2D image coordinate used to generate the first tag identifier and a first candidate position and orientation of the camera; comparing the first simulated camera image to the frame; and responsive to a determination that a result of the comparison is within a threshold, selecting the first candidate position and orientation of the first simulated camera image as the absolute 3-space position and orientation of the tracking camera.

In some embodiments, responsive to a determination that a result of the comparison is not within the threshold, a second simulated camera image is generated by using the determined 2D image coordinates and the 3-space coordinates for each 2D image coordinate used to generate the first tag identifier and a second candidate position and orientation of the camera; the second simulated camera image is compared to the frame; and responsive to a determination that a result of the comparison is within the threshold, selecting the second candidate position and orientation of the second simulated camera image as the absolute 3-space position and orientation of the tracking camera. In some embodiments, additional simulated camera images are generated and compared with the frame until a comparison result is within the threshold.

Motion Tracking: Series of Frames

In some embodiments, for each frame of image data generated by the tracking camera, the motion tracking process includes: generating a first simulated camera image by using the determined 2D image coordinates and the 3-space coordinates for each 2D image coordinate used to generate the first tag identifier and a first candidate position and orientation of the camera. For each of the frames of the image data generated within a period of time, the first simulated camera image of the frame is compared to the frame; and responsive to a determination that a result of the comparison is within a threshold, the first candidate position and orientation of the first simulated camera image is selected as the absolute 3-space position and orientation of the tracking camera at a time corresponding to the frame.

In some embodiments, responsive to a determination that a result of a comparison of a frame generated in the period of time is not within the threshold, a second simulated camera image is generated by using the determined 2D image coordinates and the 3-space coordinates for each 2D image coordinate used to generate the first tag identifier and a second candidate position and orientation of the camera; the second simulated camera image is compared to the frame; and responsive to a determination that a result of the comparison is within the threshold, selecting the second candidate position and orientation of the second simulated camera image as the absolute 3-space position and orientation of the tracking camera. In some embodiments, additional simulated camera images are generated and compared with the frame until a comparison result is within the threshold.

In some embodiments, the period of time is predetermined. In some embodiments the period of time is a time window of a moving horizon estimation process.

Using Additional Information Between Image Frames

In some embodiments, absolute 3-space position and orientation of the tracking camera generated at the process S1150 is stored. In some embodiments, each absolute 3-space position and orientation of the tracking camera generated at the process S1150 is stored in association with a time that corresponds to the 3-space position and orientation. In some embodiments, a storage device (e.g., 905 of FIG. 9) of a tracking system processing device stores the absolute 3-space position and orientation of the tracking camera generated at the process S1150. In some embodiments, a user input device (e.g., 110 of FIG. 1) stores the absolute 3-space position and orientation of the tracking camera generated at the process S1150. In some embodiments, a mobile computing device stores the absolute 3-space position and orientation of the tracking camera generated at the process S1150.

In some embodiments, during a time when absolute 3-space position and orientation of the tracking camera cannot be determined by performing a motion tracking (e.g., during a between image frame captures, during a time when an image of a tag is not captured by the tracking camera, during a device failure), 3-space absolute position and orientation of the tracking camera is estimated by using sensor data generated by a sensor of the tracking camera.

In some embodiments, current 3-space absolute position and orientation of the tracking camera is estimated by using sensor data generated by a sensor of the tracking camera, and the estimated current 3-space absolute position and orientation of the tracking camera is compared with a current 3-space absolute position and orientation of the tracking camera determined by the motion tracking process to validate the current 3-space absolute position and orientation of the tracking camera determined by the motion tracking process. In some embodiments, if the output of the motion tracking process (position and orientation) is different from the output of the estimation process (estimated position and orientation), an error handling process is performed.

In some embodiments, the sensor is an IMU.

In some embodiments, sensor data generated by the sensor is stored. In some embodiments, each portion of sensor data generated by the sensor is stored in associated with a time at which the data is sensed. In some embodiments, a storage device (e.g., 905 of FIG. 9) of a tracking system processing device stores the sensor data. In some embodiments, a user input device (e.g., 110 of FIG. 1) stores the sensor data. In some embodiments, a mobile computing device stores the sensor data.

In some embodiments, estimating a 3-space absolute position and orientation of the tracking camera includes estimating a current 3-space position and orientation based on a previously determined (and stored) 3-space position and orientation, and sensor data generated by the sensor of the tracking camera. In some embodiments, the sensor data is IMU data, and the current 3-space position and orientation is estimated by estimating movement relative to the previously determined 3-space position and orientation by using the IMU data. In some embodiments, a moving horizon estimation is used to estimate a current 3-space position and orientation of the tracking camera. Moving horizon estimation uses a sliding time window, at each sampling time the window moves one step forward. In some embodiments, sensor data sampled during the current time window (of the moving horizon estimation process) is used to estimate the current 3-space position and orientation. In some embodiments, the sensor data sampled during the current time window is stored, as described above, and the sensor data is accessed from a storage device (or memory) during the estimation process. In some embodiments, stored 3-space position and orientation determined by performing the motion tracking process during the current time window (of the moving horizon estimation process) is used to estimate the current 3-space position and orientation.

In some embodiments, estimation is performed by using an estimation model that generates an estimated current 3-space position and orientation based on sensor data sampled within a moving horizon time window. In some embodiments, estimation is performed by using a model that generates an estimated current 3-space position and orientation based on sensor data sampled within a moving horizon time window and 3-space position and orientation previously determined by the motion tracking process during the time window.

In some embodiments, the moving horizon estimation is used to estimate a current 3-space position and orientation of the tracking camera and an objective cost function of the moving horizon estimation is constructed by summing together seven (7) sub-models. In some embodiments, a trajectory model of the tracking camera (that predicts position and orientation of the camera as it changes over time) is constructed and stored on a storage device (e.g., 905). In some embodiments, the trajectory model is constructed by using a 6-degree-of-freedom (DOF) B-spline curve. In some embodiments, the 3 degrees of freedom corresponding to the position trajectory are modeled as a standard cubic B-spline. In some embodiments, the 3 degrees of freedom corresponding to orientation are modeled as a quaternion B-spline as described in in Kim et al. "A General Construction Scheme for Unit Quaternion Curves with Simple High Order Derivatives", SIGGRAPH '95 Proceedings of the 22nd annual conference on Computer graphics and interactive techniques, Pages 369-376, ACM New York, N.Y., USA 1995, the contents of which are hereby incorporated by reference.

In some embodiments, a process for constructing the objective cost function for the moving horizon estimation includes, for a sliding window of time as [T_start, T_end]: (1) for each orientation measurement generated by the IMU (e.g., 11.5) in the sliding window, generating an IMU orientation difference by comparing the orientation measurement with an orientation predicted by the trajectory model; (2) for each acceleration measurement generated by the IMU in the sliding window, generating an IMU acceleration difference by comparing the acceleration measurement with an acceleration predicted by the trajectory model; (3) for each position and orientation estimate determined by performing the motion tracking process on the camera frames in the sliding window, generating a motion tracking difference by comparing the position and orientation estimate of the motion tracking process with a corresponding position and orientation predicted by the trajectory model (4) for the position and orientation estimate for time T_end (e.g., the quantity of interest) determined by performing the motion tracking process, generating a motion tracking end difference by comparing the position and orientation estimate of the motion tracking process at time T_end with a corresponding position and orientation predicted by the trajectory model for time T_end; (5) for the position and orientation estimate for time T_end (e.g., the quantity of interest), generating a motion tracking previous window difference by comparing the position and orientation estimate of the motion tracking process at time T_end with a determined corresponding position and orientation for the end time of the previous sliding window; (6) determining a position variance of the position predicted by the trajectory model with the sliding window; and (7) determining an orientation variance of the orientation predicted by the trajectory model with the sliding window.

In some embodiments, a process for constructing the objective cost function for the moving horizon estimation includes summing: the (1) IMU orientation differences, (2) the IMU acceleration differences, (3) the motion tracking differences, (4) the motion tracking end difference, (5) the motion tracking previous window difference, (6) the position variance, and (7) the orientation variance. In some embodiments, the objective function is constructed to minimize the sum of (1) to (7) described above.

In some embodiments, the objective function is constructed to minimize the sum outputs of the seven sub-models.

FIG. 14

Figure 14:
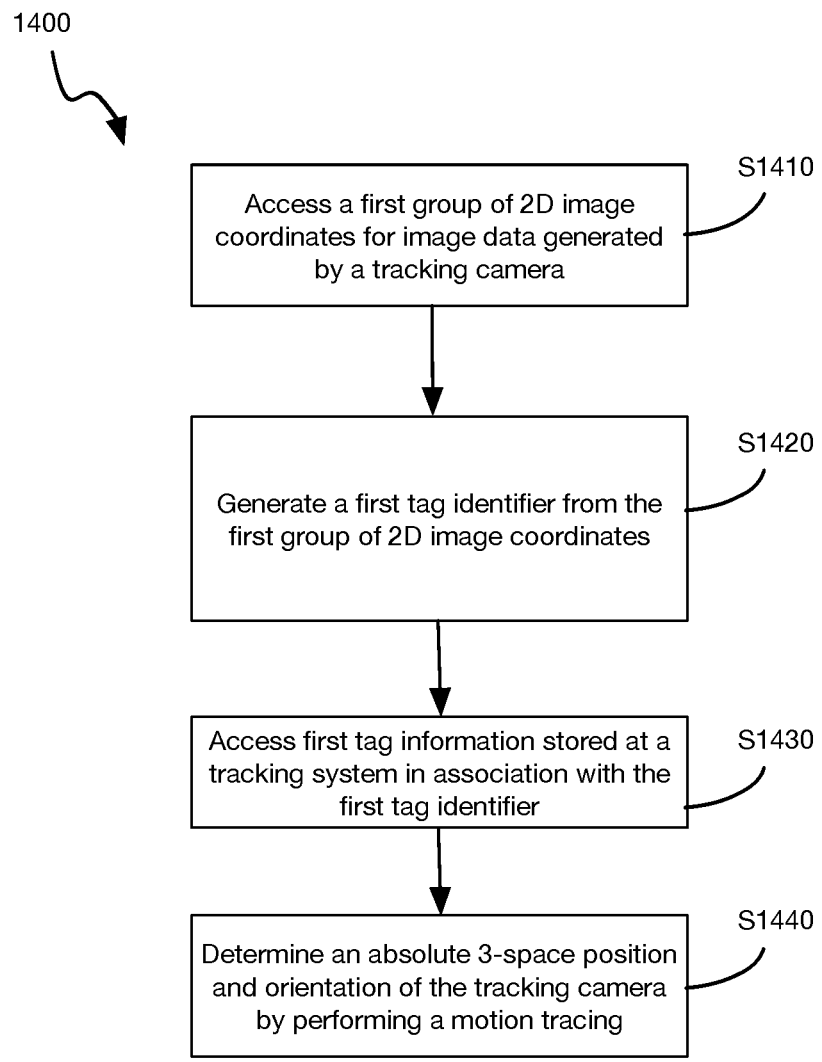
FIG. 14 is a flowchart representation of method, in accordance with embodiments.

FIG. 14 is a flowchart representation of method in accordance with embodiments. The method 1400 of FIG. 14 includes: accessing a first group of two-dimensional (2D) image coordinates for image data generated by a tracking camera (process S1410); generating a first tag identifier from the first group of 2D image coordinates (process S1420); accessing first tag information stored at the tracking system in association with the first tag identifier (process S1430);

and determining an absolute 3-space position and orientation of the tracking camera by performing a motion tracking process using the first group of 2D image coordinates and the accessed first tag information (process S1440).

In some embodiments, the method 1400 includes updating a spatial application with the determined absolute 3-space position and orientation of the tracking camera. In some embodiments, the method 1400 includes updating a spatial application with the determined absolute 3-space position and orientation of the tracking camera by providing the determined absolute 3-space position and orientation of the tracking camera to a spatial application computing device (e.g., 140 of FIGS. 1 and 10).

In some embodiments, the method 1400 is performed by a tracking system, as described herein. In some embodiments, at least one process of the method 1400 is performed by a tracking system, as described herein.

In some embodiments, generating a first tag identifier from the first group of 2D image coordinates is performed as described herein for process S1130.

In some embodiments, the process S1410 includes performing a process similar to the process S1110 of FIG. 11. In some embodiments, the process S1410 includes performing a process similar to the process S1120 of FIG. 11. In some embodiments, the process S1420 is similar to the process S1130 of FIG. 11. In some embodiments, the process S1430 is similar to the process S1140 of FIG. 11. In some embodiments, the process S1440 is similar to the process S1150 of FIG. 11.

Machines

The systems and methods of the embodiments and variations thereof can be embodied and/or implemented at least in part as a machine configured to receive a computer-readable medium storing computer-readable instructions. The instructions are preferably executed by computer-executable components preferably integrated with the spatial operating environment system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

CONCLUSION

As a person skilled in the art will recognize from the previous detailed description and from the figures and claims, modifications and changes can be made to the embodiments disclosed herein without departing from the scope defined in the claims.

What is claimed is:

1. A method comprising:
   for each frame of image data generated by a tracking camera:
      determining each blob of the frame;
      for each determined blob, determining a 2D image coordinate of a centroid of the blob in a coordinate space of the frame;
      a tracking system processor generating a first tag identifier from the determined 2D image coordinates;
      the tracking system processor using the first tag identifier to access stored first tag information that is stored in association with the first tag identifier; and
      the tracking system processor determining an absolute 3-space position and orientation of the tracking camera by performing a motion tracking process using the determined 2D image coordinates and the accessed first tag information,
   wherein an image processor that is constructed to perform real-time feature extraction determines each blob and determines each 2D image coordinate,
   wherein the image processor and the tracking camera are included in a user input device,
   wherein the tracking system processor is included in a tracking system processing device that is external to the user input device, and
   wherein the user input device is communicatively coupled to the tracking system processing device via a communication interface of the user input device.

2. The method of claim 1,
   wherein a plurality of 2D image coordinates are determined,
   wherein generating a first tag identifier from the determined 2D image coordinates comprises:
      selecting a first 2D image coordinate of the plurality of 2D image coordinates;
      for each remaining 2D image coordinate of the plurality of 2D image coordinates, determining a distance between the remaining 2D image coordinate and the first 2D image coordinate;
      selecting five remaining 2D image coordinates having shortest distances to the first 2D image coordinate from among the determined distances; and
      determining whether a first candidate set that includes the first 2D image coordinate and the selected five remaining 2D image coordinates includes a first sub-set of 2D image coordinates that form a first straight line and a second sub-set of 2D image coordinates that form a second straight line, and
   wherein responsive to a determination that the first candidate set includes a first sub-set of 2D image coordinates that form a first straight line and a second sub-set of 2D image coordinates that form a second straight line, the first tag identifier is generated by using the 2D image coordinates of the first candidate set.

3. The method of claim 2,
   wherein the tracking system processor generating the first tag identifier comprises:
      determining a first intersection coordinate of an intersection between the first straight line and the second straight line;
      determining a first cross ratio by using the three coordinates of the first sub-set of 2D image coordinates and the first intersection coordinate; and
      determining a second cross ratio by using the three coordinates of the second sub-set of 2D image coordinates and the first intersection coordinate,
   wherein the first tag identifier is a pair that includes the first cross ratio and the second cross ratio.

4. The method of claim 2,
   wherein the tracking system processor generating the first tag identifier comprises:
      determining a first intersection coordinate of an intersection between the first straight line and the second straight line;
      determining a first cross ratio by using the three coordinates of the first sub-set of 2D image coordinates and the first intersection coordinate;

determining a second cross ratio by using the three coordinates of the second sub-set of 2D image coordinates and the first intersection coordinate;

determining a first vector cross product of the first straight line and the second straight line;

responsive to a determination that the first vector cross product is a positive value, forming a first ordered pair that includes the first cross ratio as a first value of the first ordered pair and that includes the second cross ratio as a second value of the first ordered pair, wherein the first tag identifier is the first ordered pair; and responsive to a determination that the first vector cross product is a negative value, forming a second ordered pair that includes the second cross ratio as a first value of the second ordered pair and that includes the first cross ratio as a second value of the second ordered pair, wherein the first tag identifier is the second ordered pair.

5. The method of claim 1, wherein the first tag information includes 3-space coordinates for each 2D image coordinate used to generate the first tag identifier, and wherein determining an absolute 3-space position and orientation of the tracking camera by performing a motion tracking process comprises: performing the motion tracking process by using the 2D image coordinates used to generate the first tag identifier and the accessed 3-space coordinates for each 2D image coordinate used to generate the first tag identifier.

6. The method of claim 1, wherein a tag that corresponds to the first tag identifier includes a plurality of tag elements, and wherein the first tag information includes a 3-space coordinate for the tag, wherein each 2D image coordinate used to generate the first tag identifier corresponds to one of the plurality of tag elements of the tag, wherein the first tag information includes spacing information for the plurality of tag elements of the tag, and wherein determining an absolute 3-space position and orientation of the tracking camera by performing a motion tracking process comprises:

determining a 3-space coordinate for each 2D image coordinate used to generate the first tag identifier by using the 3-space coordinate of the tag and the spacing information; and performing the motion tracking process by using the 2D image coordinates used to generate the first tag identifier and the determined 3-space coordinates for each 2D image coordinate used to generate the first tag identifier.

7. The method of claim 6, wherein the 3-space coordinate for the tag corresponds to the intersection point of two lines formed by the elements of the tag.

8. The method of claim 6, wherein at least one element of the tag is a retroreflective marker that is constructed to reflect at least one IR (infrared) wavelength.

9. The method of claim 6, wherein at least one element of the tag is an IR emitter that is constructed to emit at least one IR wavelength.

10. The method of claim 1, wherein 3-space absolute position and orientation of the tracking camera is estimated by using sensor data generated by a sensor of the tracking camera.

11. The method of claim 10, wherein the sensor is an IMU (Inertial Measurement Unit).

12. The method of claim 10, wherein estimating a 3-space absolute position and orientation of the tracking camera comprises:

estimating a current 3-space position and orientation based on a previously determined 3-space position and orientation, and sensor data generated by the sensor of the tracking camera.

13. The method of claim 12, wherein a moving horizon estimation process is used to estimate the current 3-space position and orientation of the tracking camera, wherein sensor data sampled during a current time window of the moving horizon estimation process is used to estimate the current 3-space position and orientation.

14. The method of claim 13, wherein a stored 3-space position and orientation determined by performing the motion tracking process during the current time window of the moving horizon estimation process is used to estimate the current 3-space position and orientation.

15. A tracking system comprising:

a network device;

a user input device that comprises:

a tracking camera, and an image processor that is constructed to perform real-time feature extraction;

at least one processing unit; and a storage device that stores machine-executable instructions, that when executed by the at least one processing device, control the tracking system to:

access a first group of two-dimensional (2D) image coordinates for image data generated by the tracking camera, generate a first tag identifier from the first group of 2D image coordinates, access first tag information stored at the tracking system in association with the first tag identifier, and determine an absolute 3-space position and orientation of the tracking camera by performing a motion tracking process using the first group of 2D image coordinates and the accessed first tag information, wherein the at least one processing unit, the network device and the storage device are included in a tracking system processing device that is external to the user input device, and wherein the user input device is communicatively coupled to the tracking system processing device via a communication interface of the user input device.

16. The system of claim 15, wherein the instructions that control the tracking system to generate the first tag identifier include instructions that when executed by the at least one processing device, control the tracking system to:

select a first 2D image coordinate of the first group of 2D image coordinates;

for each remaining 2D image coordinate of the first group of 2D image coordinates, determine a distance between the remaining 2D image coordinate and the first 2D image coordinate;

select five remaining 2D image coordinates having shortest distances to the first 2D image coordinate from among the determined distances; and determine whether a first candidate set that includes the first 2D image coordinate and the selected five remaining 2D image coordinates includes a first sub-set of 2D image coordinates that form a first straight line and a second sub-set of 2D image coordinates that form a second straight line, and wherein responsive to a determination that the first candidate set includes a first sub-set of 2D image coordinates that form a first straight line and a second sub-set of 2D image coordinates that form a second straight line, generate the first tag identifier by using the 2D image coordinates of the first candidate set.

17. The system of claim 16, wherein the instructions that control the tracking system to generate the first tag identifier include instructions that when executed by the at least one processing device, control the tracking system to:

determine a first intersection coordinate of an intersection between the first straight line and the second straight line;

determine a first cross ratio by using the three coordinates of the first sub-set of 2D image coordinates and the first intersection coordinate;

determine a second cross ratio by using the three coordinates of the second sub-set of 2D image coordinates and the first intersection coordinate, wherein the first tag identifier is a pair that includes the first cross ratio and the second cross ratio.

18. A method comprising:

for each frame of image data generated by a tracking camera:

determining each blob of the frame;

for each determined blob, determining a 2D image coordinate of a centroid of the blob in a coordinate space of the frame;

a tracking system processor generating a first tag identifier from the determined 2D image coordinates;

the tracking system processor using the first tag identifier to access stored first tag information that is stored in association with the first tag identifier; and the tracking system processor determining an absolute 3-space position and orientation of the tracking camera by performing a motion tracking process using the determined 2D image coordinates and the accessed first tag information, wherein the tracking system processor and the tracking camera are included in a mobile computing device, and wherein the mobile computing device determines each blob and determines each 2D image coordinate.

* * * * *